(12) United States Patent
Nakamura et al.

(10) Patent No.: US 10,871,816 B2
(45) Date of Patent: Dec. 22, 2020

(54) MODULE DEVICE AND BROADCAST SYSTEM

(71) Applicant: SONY CORPORATION, Tokyo (JP)

(72) Inventors: Sensaburo Nakamura, Kanagawa (JP); Shunta Echigoya, Kanagawa (JP)

(73) Assignee: SONY CORPORATION, Tokyo (JP)

(*) Notice: Subject to any disclaimer, the term of this patent is extended or adjusted under 35 U.S.C. 154(b) by 74 days.

(21) Appl. No.: 16/307,075

(22) PCT Filed: Jun. 6, 2017

(86) PCT No.: PCT/JP2017/021037
§ 371 (c)(1),
(2) Date: Dec. 4, 2018

(87) PCT Pub. No.: WO2017/217284
PCT Pub. Date: Dec. 21, 2017

(65) Prior Publication Data
US 2019/0146570 A1    May 16, 2019

(30) Foreign Application Priority Data
Jun. 16, 2016  (JP) ................ 2016-119499

(51) Int. Cl.
*G06F 1/3206* (2019.01)
*H04L 12/28* (2006.01)
(Continued)

(52) U.S. Cl.
CPC .......... *G06F 1/3206* (2013.01); *H02J 1/00* (2013.01); *H02J 1/06* (2013.01); *H02J 13/00* (2013.01);
(Continued)

(58) Field of Classification Search
CPC .......... G06F 1/3206; G06F 1/263; G06F 1/28; G06F 1/266; G06F 1/305; H02J 1/00;
(Continued)

(56) References Cited

U.S. PATENT DOCUMENTS 8,674,546 B1 * 3/2014 Dix .................. H04L 12/10
307/65
9,507,113 B2 * 11/2016 Lawson .............. G02B 6/4452
(Continued)

FOREIGN PATENT DOCUMENTS

AU    2013377862 A1    7/2015
CN    105191338 A    12/2015
(Continued)

OTHER PUBLICATIONS

International Search Report and Written Opinion of PCT Application No. PCT/JP2017/021037, dated Jul. 18, 2017, 10 pages of ISRWO.

*Primary Examiner* — Nimesh G Patel
(74) *Attorney, Agent, or Firm* — Chip Law Group

(57) ABSTRACT

Provided is a plurality of modules containing a computer that has a network interface to which power is supplied with PoE. The plurality of modules is connected to a network. A first module that receives a response indicating that requested power is not able to be supplied from the network performs a process of displaying an abnormality. The first module notifies a second module of the abnormality via the network. The second module controls display of the abnormality when the second module is notified of the abnormality.

13 Claims, 21 Drawing Sheets

(51) Int. Cl.
  *H04L 12/46* (2006.01)
  *H04L 12/26* (2006.01)
  *H02J 1/06* (2006.01)
  *H02J 13/00* (2006.01)
  *H04L 12/12* (2006.01)
  *H02J 1/00* (2006.01)
  *H04L 12/10* (2006.01)
  *H04L 12/931* (2013.01)

(52) U.S. Cl.
  CPC .......... *H02J 13/0003* (2013.01); *H04L 12/10* (2013.01); *H04L 12/12* (2013.01); *H04L 12/28* (2013.01); *H04L 12/2878* (2013.01); *H04L 12/4625* (2013.01); *H04L 43/00* (2013.01); *H04L 49/40* (2013.01)

(58) Field of Classification Search
  CPC .......... H02J 1/06; H02J 13/00; H02J 13/0003; H02J 13/0005; H04L 12/10; H04L 12/12; H04L 12/28; H04L 12/2878; H04L 12/4625; H04L 43/00; H04L 49/40
  See application file for complete search history.

(56) References Cited

U.S. PATENT DOCUMENTS

| | | | |
|---|---|---|---|
| 2014/0219656 A1 | 8/2014 | Lawson et al. | |
| 2014/0250327 A1* | 9/2014 | Flynn | G06F 1/30 714/22 |
| 2018/0228007 A1* | 8/2018 | Siefer | H02J 7/0068 |
| 2019/0182056 A1* | 6/2019 | Ramanujam | H04L 12/10 |

FOREIGN PATENT DOCUMENTS

| | | |
|---|---|---|
| JP | 2007-158590 A | 6/2007 |
| JP | 2009-106127 A | 5/2009 |
| JP | 2010-115064 A | 5/2010 |
| JP | 2013-247652 A | 12/2013 |
| JP | 2016-515314 A | 5/2016 |
| KR | 10-2015-0115813 A | 10/2015 |
| MX | 2015009917 A | 1/2016 |
| WO | 2014/123638 A1 | 8/2014 |

* cited by examiner

MODULE DEVICE AND BROADCAST SYSTEM

CROSS REFERENCE TO RELATED APPLICATIONS

This application is a U.S. National Phase of International Patent Application No. PCT/JP2017/021037 filed on Jun. 6, 2017, which claims priority benefit of Japanese Patent Application No. JP 2016-119499 filed in the Japan Patent Office on Jun. 16, 2016. Each of the above-referenced Applications is hereby incorporated herein by reference in its entirety.

TECHNICAL FIELD

The present technology relates to a module device and a broadcast system.

BACKGROUND ART

In the related art, there are known technologies for Power over Ethernet (PoE: registered trademark). The technologies are technologies for supplying power using cables of Ethernet (registered trademark) (for example, see Patent Literature 1). PoE basically includes two elements, a powered device (PD) that receives power via an Ethernet cable and power sourcing equipment (PSE) that supplies power via an Ethernet cable.

CITATION LIST

Patent Literature

Patent Literature 1: JP 2009-106127A

DISCLOSURE OF INVENTION

Technical Problem

An object of the present technology is to perform power error display satisfactorily in a plurality of modules to which power is supplied with a PoE technology.

Solution to Problem

A concept of the present technology is a module device including: a plurality of modules containing a computer that has a network interface to which power is supplied with PoE. The plurality of modules are connected to a network. A first module that receives a response indicating that requested power is not able to be supplied from the network performs a process of displaying an abnormality.

The module device according to the present technology includes the plurality of modules. Power is supplied to each module with the PoE. Each module contains a computer that has a network interface to which power is supplied with the PoE. The plurality of modules are connected to the network. The first module receiving the response indicating that requested power is not able to be supplied from the network performs the process of displaying an abnormality.

For example, the first module may notify a second module of the abnormality via the network. The second module may control display of the abnormality when the second module is notified of the abnormality. In this case, for example, the second module may be a module that has an indicator. The second module may perform control such that the abnormality is displayed on the indicator. In addition, in this case, for example, a subordinate module connected to the second module to function may be further included. The second module may perform control such that the abnormality is displayed on an indicator of the subordinate module. Here, for example, the indicator may be a lighting component included in a button mechanism. The abnormality may be displayed in a different display mode from a normal mode of the lighting component.

In addition, in this case, for example, the plurality of modules may include a mechanically coupled module group and one or more mechanically uncoupled modules. The second module may be one of the mechanically uncoupled modules. In addition, in this case, for example, the plurality of modules may be mechanically coupled. The first module may add relative positional information of the first module and notify the second module of the abnormality. Then, in this case, the second module may control the display of the abnormality in combination with display of the positional information when the second module is notified of the abnormality.

In addition, for example, the plurality of modules or the plurality of modules and a subordinate module connected to one of the plurality of modules to function may be mechanically coupled. According to the process of displaying the abnormality in the first module, the abnormality may be displayed on an indicator of the module located at a specific position in a relative positional relation in the mechanically coupled modules. In this case, for example, the module located at the specific position may include a plurality of indicators. The abnormality may be displayed on a specific indicator among the plurality of indicators.

In this way, according to the present technology, the first module receiving the response indicating that requested power is not able to be supplied from the network performs the process of displaying an abnormality, for example, notifies the second module of the abnormality via the network. Therefore, it is possible to perform power error display satisfactorily in the plurality of modules to which power is supplied with a PoE technology.

In addition, another concept of the present technology is a module device including: a plurality of modules containing a computer that has a network interface to which power is supplied with PoE. The plurality of modules are connected to a network. A second module that receives a power error message from a first module via the network controls display of an abnormality.

The module device according to the present technology includes the plurality of modules. Power is supplied to each module with the PoE technology. Each module contains the computer that has the network interface to which power is supplied with the PoE. The plurality of modules are connected to the network. The second module receiving the power error message from the first module via the network controls the display of the abnormality.

For example, the second module is a module that has an indicator. The second module may control the display of the abnormality such that the abnormality is displayed on the indicator. In addition, for example, the module device may further include the subordinate module connected to the second module to function. The second module may perform control such that an abnormality is displayed on an indicator of the subordinate module.

In this way, according to the present technology, the second module receiving the power error message from the first module via the network controls the display of the abnormality. Therefore, it is possible to perform the power error display satisfactorily in the plurality of modules to which power is supplied with the PoE technology.

In addition, still another concept of the present technology is a broadcast system including: a control panel. The control panel includes a plurality of modules containing a computer that has a network interface to which power is supplied with PoE. The plurality of modules are connected to a network. A module that receives a response indicating that requested power is not able to be supplied from the network performs a process of displaying an abnormality.

According to the present technology, the control panel includes the plurality of modules containing a computer that has the network interface to which power is supplied with the PoE. The plurality of modules are connected to the network. The module receiving the response indicating that requested power is not able to be supplied from the network performs the process of displaying an abnormality. For example, the module receiving the response indicating that requested power is not able to be supplied from the network notifies another module of the abnormality via the network. When the other module is notified of the abnormality, the other module performs the process of displaying the abnormality.

In this way, according to the present technology, the module receiving the response indicating that requested power is not able to be supplied from the network performs the process of displaying the abnormality, for example, notifies another module of the abnormality via the network. Therefore, it is possible to perform the power error display satisfactorily in the plurality of modules to which power is supplied with the PoE technology.

Advantageous Effects of Invention

According to the present technology, it is possible to perform the power error display satisfactorily in the plurality of modules to which power is supplied with the PoE technology. Note that the effects described above are not necessarily limitative and any effect described in the present disclosure may be achieved.

DISCLOSURE OF INVENTION

Figure 1:
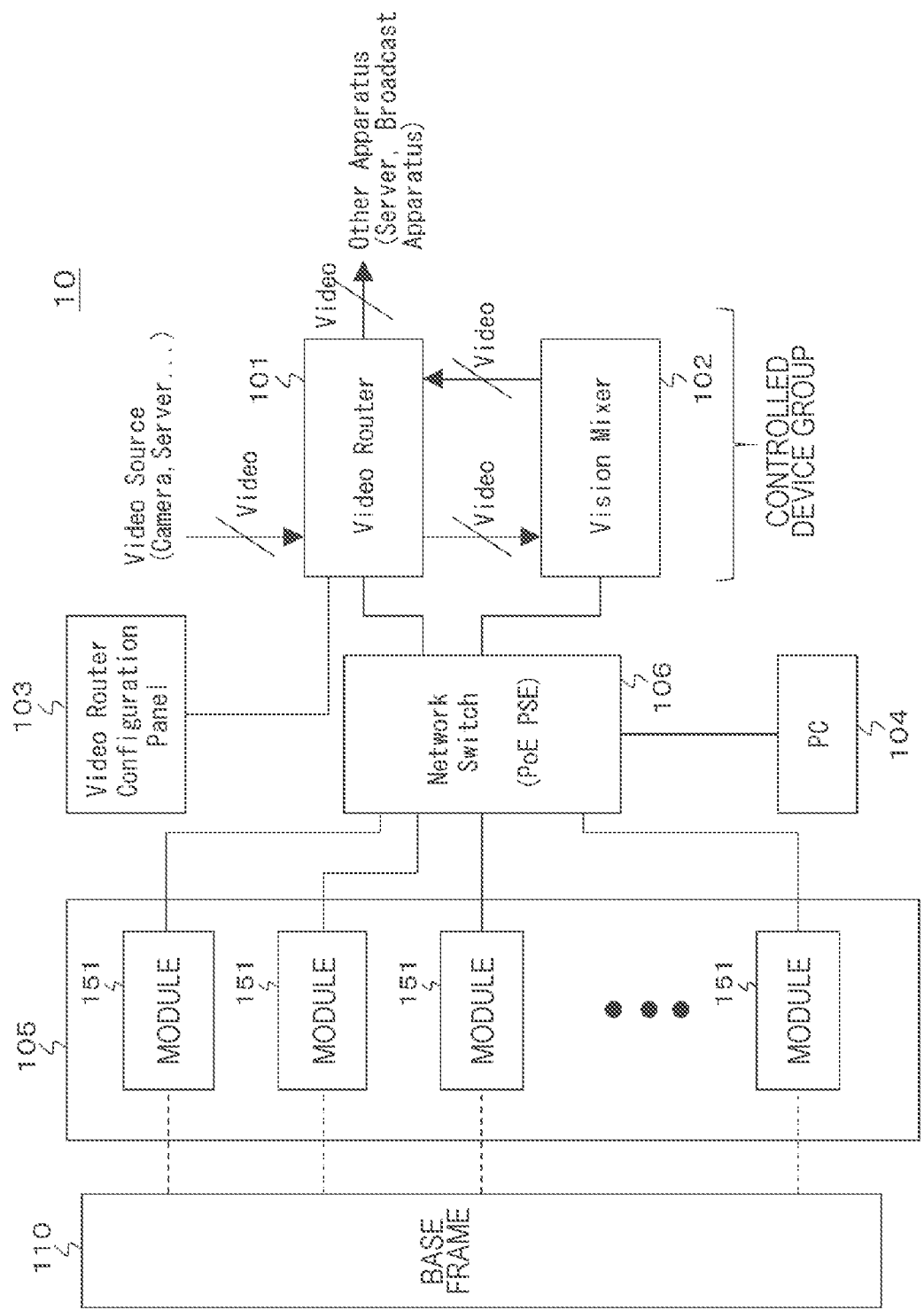
FIG. 1 is a block diagram illustrating a configuration example of a broadcast system.

Hereinafter, a mode for carrying out the invention (hereinafter referred to as an "embodiment") will be described. Note that the description will be made in the following order.
1. Embodiment
2. Modification Examples 1. Embodiment Configuration Example of Broadcast System FIG. 1 is a block diagram illustrating a configuration example of a broadcast system 10. The broadcast system 10 includes a video router 101, a vision mixer 102, a video router configuration panel 103, a personal computer 104, a switcher control panel 105, and a network switch 106.

The video router 101 is a device that converts (distributes) a video signal or the like. A video signal output of the video router 101 is sent to a broadcast radio wave sending device or the like. The video router 101 connects any input video to each video output route and outputs a video signal. The video router configuration panel 103 is a console that receives various setting manipulations of the video router 101. The video router configuration panel 103 also receives a manipulation of converting a signal (transmission route decision) of the video router 101 and controls the video router 101. An operation of the video router 101 is not excessively changed during use.

The vision mixer 102 generates an output video signal on the basis of a plurality of input video signals. In principle, input and output video signals of the vision mixer 102 are all received from and transmitted to other devices via the video router 101. An operation of the vision mixer 102 is frequently changed during use.

The switcher control panel 105 is a console that receives a manipulation of changing an operation of the vision mixer 102 or the video router 101. The switcher control panel 105 receives a manipulation of changing an operation of the vision mixer 102 or the video router 101 and controls the vision mixer 102 or the video router 101. The switcher control panel 105 normally controls only the vision mixer 102 and controls the video router 101 in special cases.

When a command route for controlling the video router 101 is used from the switcher control panel 105, an instruction to select a certain input video signal from main outputs from the video router 101, for example, video signals to broadcast to radio wave sending devices, can also be given from the switcher control panel 105. Accordingly, when one cross point button line configured to send a command to the video router 101 can be manipulated on the entire panel of the switcher control panel 105, minimum use is possible in the broadcast system 10.

The switcher control panel 105 includes a plurality of modules 151. Each module 151 is connected to the vision mixer 102 or the video router 101 via the network switch 106. Each module 151 contains a computer (CPU) that has a network interface to which power is supplied with PoE. Here, each module 151 is included in a powered device (PD) that receives power and the network switch 106 is included in power sourcing equipment (PSE) that supplies power.

Figure 2:
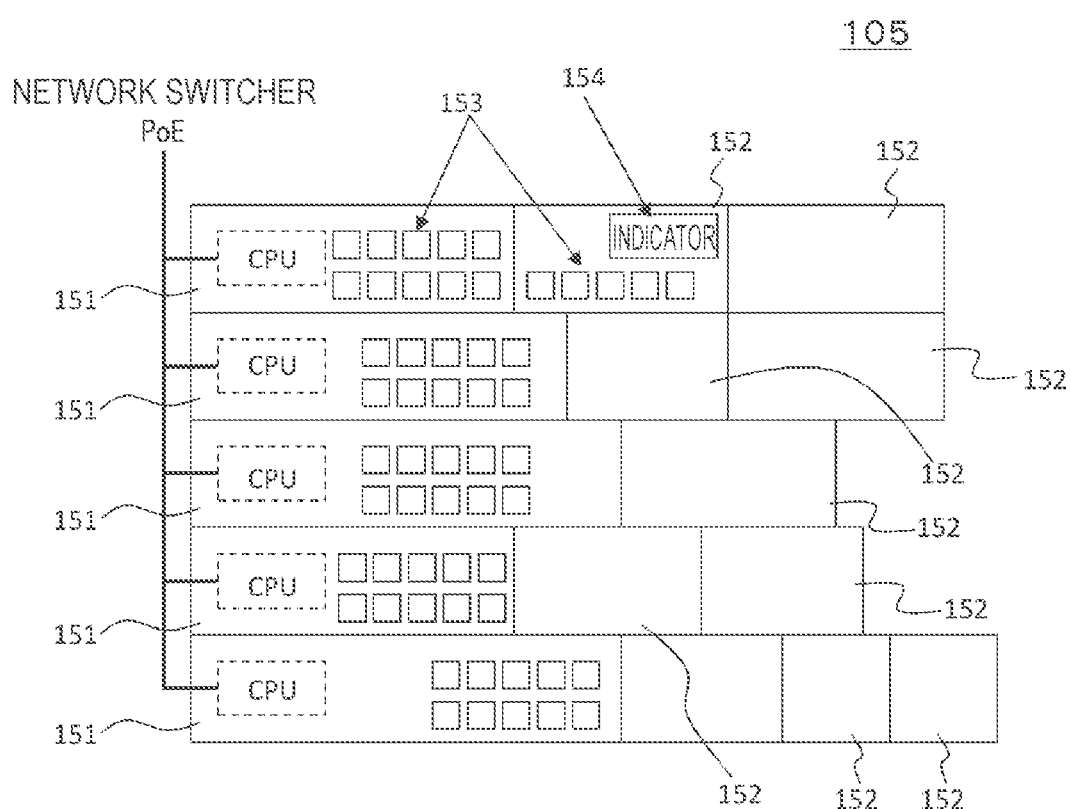
FIG. 2 is a diagram illustrating a configuration example in which a plurality of modules are mechanically coupled in a switcher control panel.

FIG. 2 is a diagram illustrating a configuration example in which the plurality of modules 151 are mechanically coupled in the switcher control panel 105. In the switcher control panel 105, there is also a subordinate module 152 which is a module connected to the module 151 to function in addition to the module 151 to which power is supplied with the PoE. Note that connection between the network switch 106 and each module 151 is star connection in which each module 151 is directly connected to the network switch 106.

In addition, the subordinate module 152 may not contain a computer (CPU). The subordinate module 152 that does not contain a computer (CPU) is controlled by a module that contains a computer (CPU) in the same line (in the horizontal direction in the drawing).

In the illustrated example, the module 151 to which power is supplied with PoE is disposed at the left end. In addition, in the module 151 or the subordinate module 152, a push button 153 or an indicator 154 is disposed on its front surface as necessary. Note that, in the illustrated example, the push button 153 or the indicator 154 is appropriately omitted to simplify the drawing.

Figure 3:
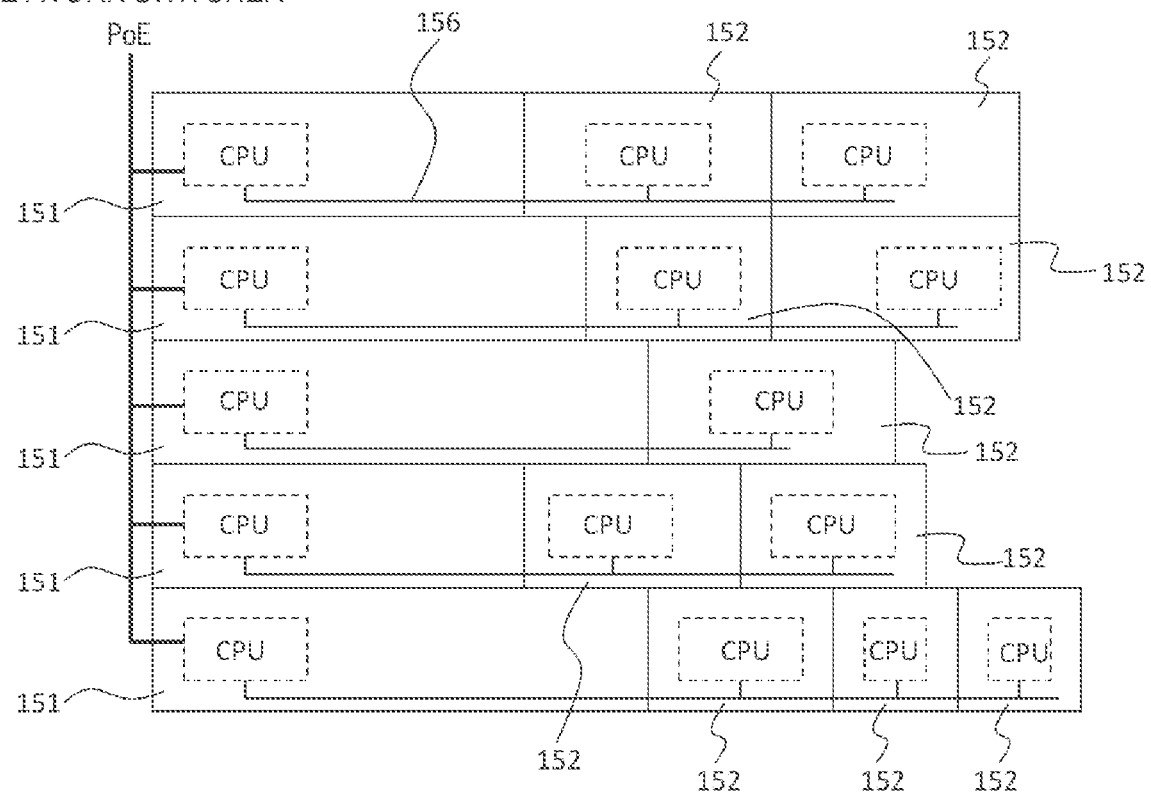
FIG. 3 is a diagram illustrating a disposition example of a power supply line for supplying power to subordinate modules in the same line connected to a module from the module to which power is supplied with PoE.

FIG. 3 is a diagram illustrating a disposition example of a power supply line 156 for supplying power to subordinate modules 152 in the same line (in the horizontal direction in the drawing) connected to a module from the module 151 to which power is supplied with PoE. In the illustrated example, all the subordinate modules 152 contain the computers (CPUs), but all the subordinate modules 152 may not necessarily contain the computers (CPUs).

Figure 4:
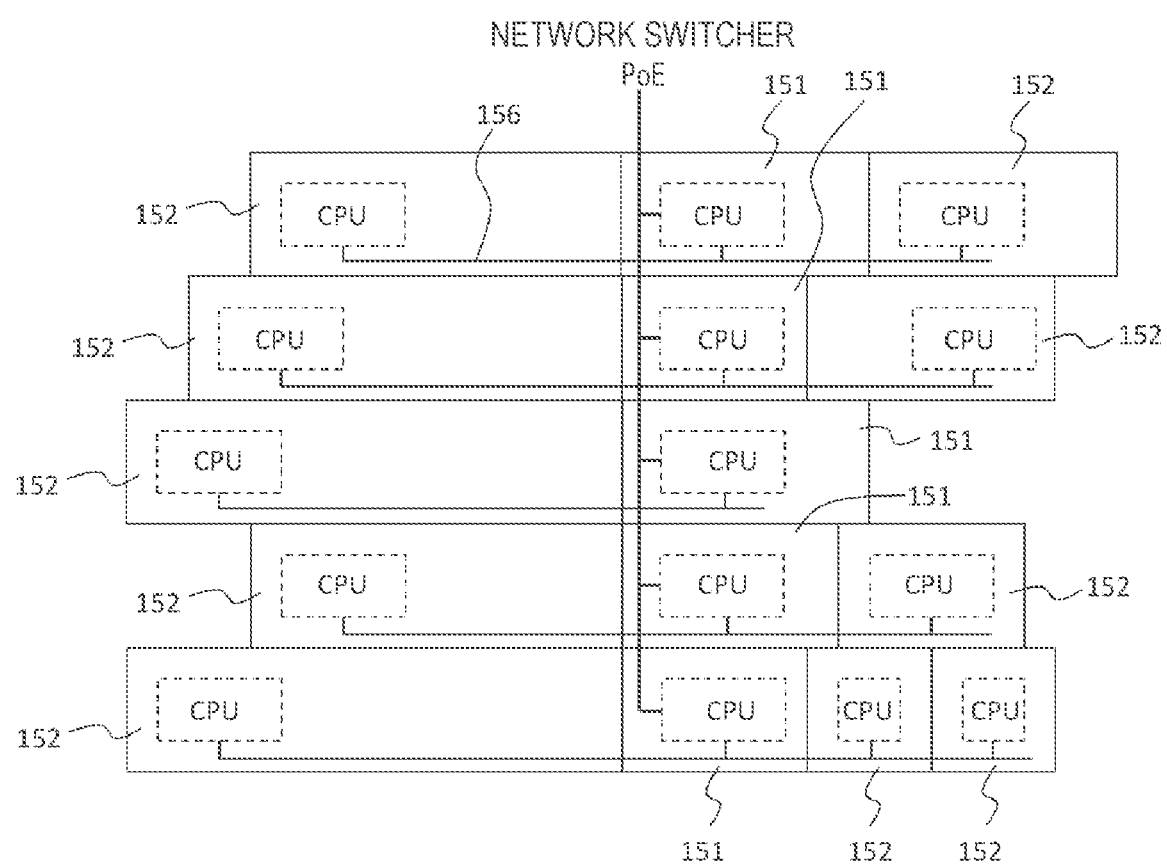
FIG. 4 is a diagram illustrating an example in which the position of the module to which power is supplied with PoE is not an end (a right end or a left end).

Note that, as illustrated in FIG. 4, an example in which the position of the module 151 to which the power is supplied with PoE is not an end (a left end or a right end) can be considered. In this case, there is the advantage that the power supply line 156 from the module 151 to which the power is supplied with the PoE to the subordinate module 152 is short.

Figure 5:
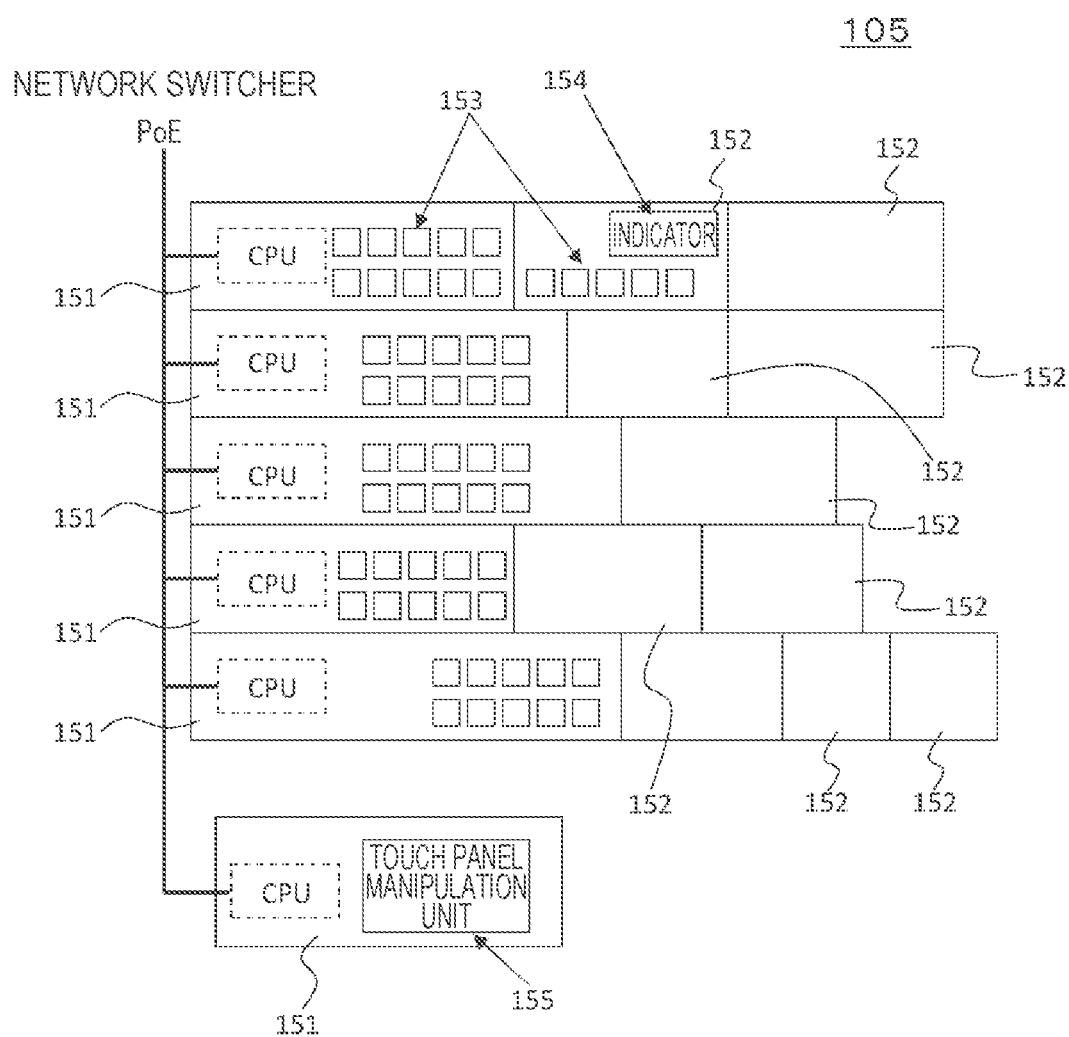
FIG. 5 is a diagram illustrating a configuration example in which an uncoupled module including a touch panel manipulation unit is included along with the plurality of mechanically coupled modules in the switcher control panel.

FIG. 5 is a diagram illustrating a configuration example in which an uncoupled module 151 including a touch panel manipulation unit 155 is included along with the plurality of mechanically coupled modules 151 in the switcher control panel 105. Note that a configuration in which there are the plurality of uncoupled modules 151 can also be considered.

Figure 6:
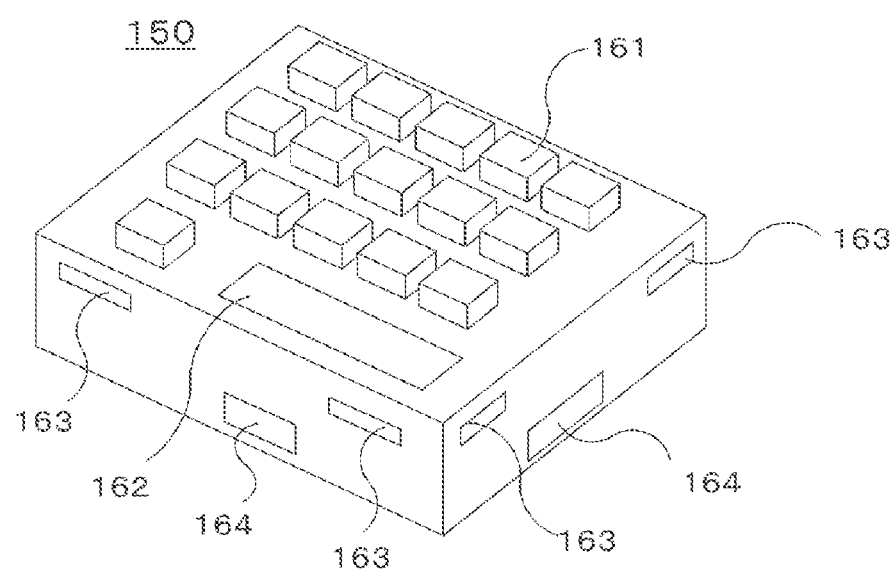
FIG. 6 is a diagram illustrating an exemplary exterior of the module.

FIG. 6 is a diagram illustrating an exemplary exterior of a module 150 (the module 151 and the module 152). User interface (UI) components such as lighting push buttons 161, text indicators 162, and the like are disposed on the front surface of the module. The lighting push buttons 161 are push button switch mechanisms, convert a push manipulation of a manipulator into an electric signal, include a plurality of different color light emitting diodes (LEDs) therein, can light a plurality of kinds of colors, and can display a state of a manipulation target device function. The text indicator 162 performs text display by means of a liquid crystal panel or the like and display a device state.

Connection metal fitting portions 163 and connector portions 164 are on the side surfaces of the module. The connection metal fitting portion 163 is a structure that is mechanically coupled with another adjacent module or the like and has a shape or the like configured for coupling by a screw, which is a known technology. The details thereof will be omitted. The connector portion 164 is an electric connector that includes a plurality of electric contacts and is a structure that connects an adjacent module to a circuit. In each module 150, a size and UI components on the front surface are various for each kind of module and a UI function which is considered to be an object of all coupled components is realized.

Figure 7:
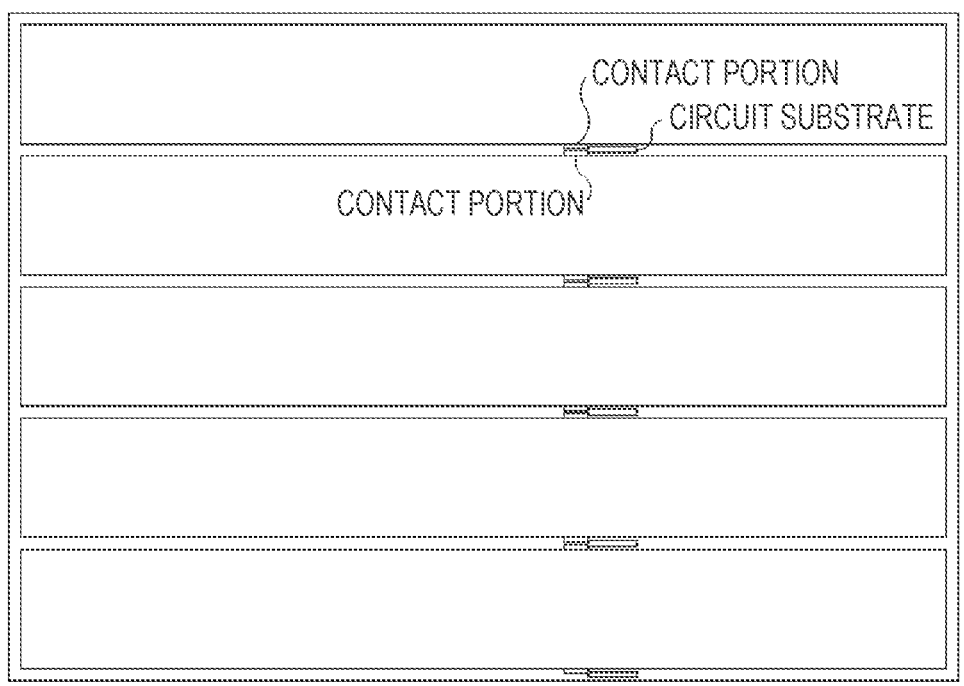
FIG. 7 is a diagram illustrating an example of a structure of a base frame.

Note that a base frame in which the modules are installed may be provided in addition to the modules coupled with the connection metal fitting portions 163. FIG. 7 is a diagram illustrating an example of a structure of a base frame 110.

In each line of the modules, the modules are directly coupled to each other, but a frame is between the lines and the modules are fitted in the frame. The connector portions 164 in other lines are connected to the connector portions 164 in the other lines via contact portions provided in the frame. Note that, for example, in the case of the configuration example of FIG. 4, only the modules 151 to which the power is supplied with PoE are electrically connected to other lines. The base frame 110 is used to increase the overall strength.

The base frame 110 and each module 150 (the module 151 and the module 152) are fixed to each other, for example, by screwing from the bottom surface of the base frame 110. For example, a position at which each module 151 is located can be detected in the entire base frame 110 by detecting a local shape provided in the base frame 110. Alternatively, for example, a position at which each module 151 is located in the entire base frame 110, for example, a line in which each module 151 is located, can be detected by connecting the module 151 to a circuit provided locally in the base frame 110 via the connector portion 164.

Note that, as described above, the connector connected to a PoE network is included in the module, but the connector connected to a PoE network may be provided in the base frame 110 and an electric circuit may be connected by an independent connector portion between the base frame 110 and the module. Each module may not use a PoE function when a DC or AC power line (connector) is provided instead of PoE and power can be obtained from the DC or AC power line, and may operate in a function described in the present specification only in a case in which power may not be obtained.

Figure 8:
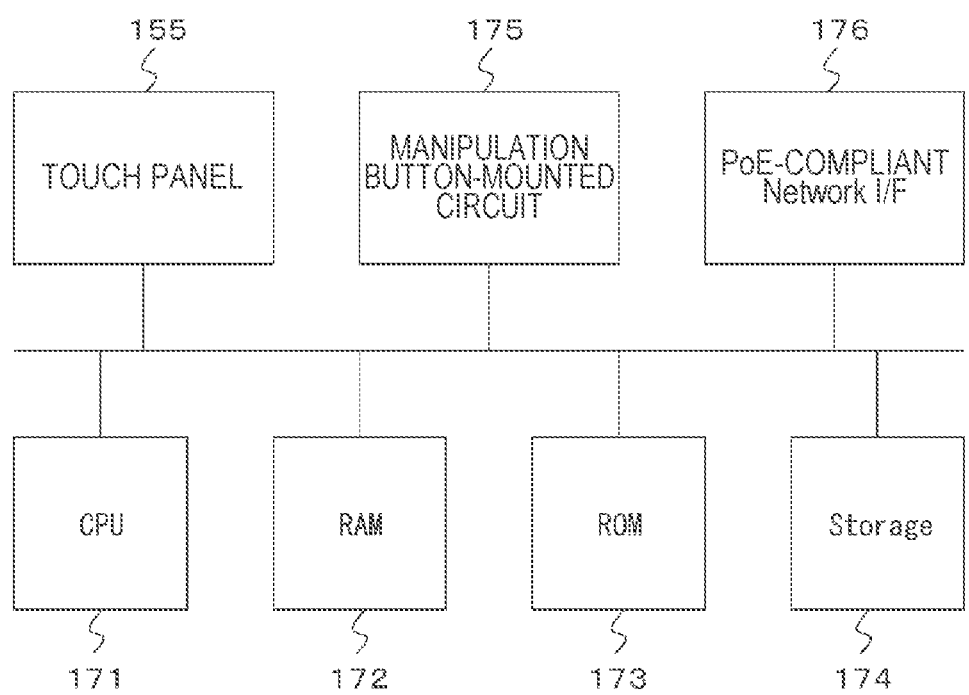
FIG. 8 is a block diagram illustrating a configuration example of the module including a touch panel manipulation unit.

FIG. 8 is a block diagram illustrating a configuration example of the module 151 including the touch panel manipulation unit 155. The module 151 includes a CPU 171, a RAM 172, a ROM 173, a storage 174, a touch panel manipulation unit 155, a manipulation button-mounted circuit 175, and a PoE-compliant network interface 176. The storage 174 retains a power error history. In this way, in a case of the configuration in which the power error history is retained, a module detecting a power error is assumed to necessarily perform a process of transmitting an error notification with this module set as a destination.

Figure 9:
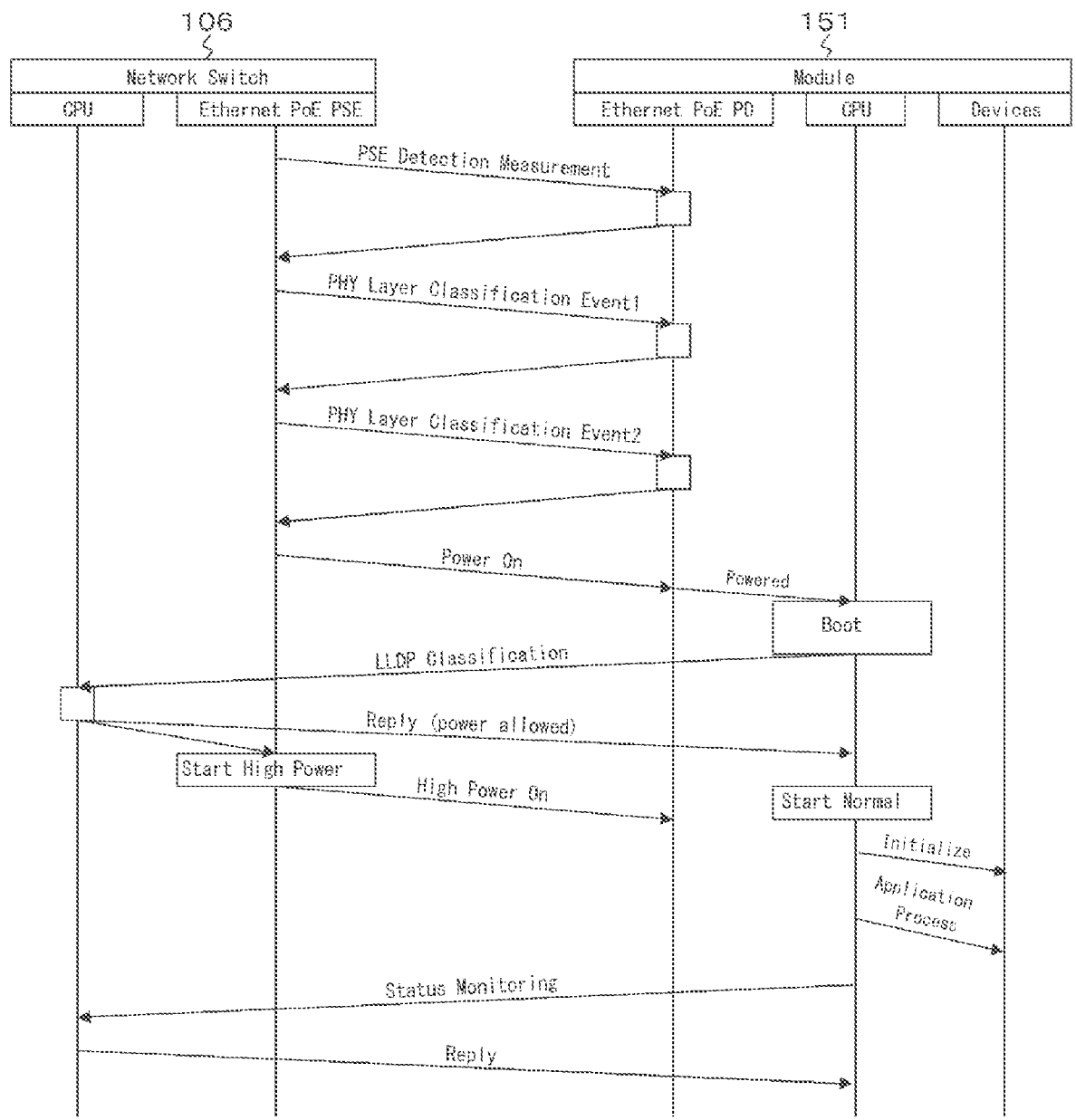
FIG. 9 is a diagram illustrating a sequence of general communication performed in association with power supply of PoE between a network switch and the module.

FIG. 9 is a diagram illustrating a sequence of general communication performed in association with power supply of the PoE between the network switch 106 and the module 151. In the module 151, exchange with a PSE (Network Switch) is performed by hardware before software is activated. Therefore, minimum power is supplied by "Power On" and the software is booted and activated on the CPU.

After the software is activated, the software of the module 151 performs negotiation with the PSE (Network Switch) by a link layer discovery protocol (LLDP). A response indicating that the requested power is allowed is received (power allowed) when the requested power is possible on the PSE side. In a case in which no response comes or a case in which a smaller value than the requested power value is returned, a failure is determined.

When success is determined (allowed), the requested power is supplied (that is, the module can be used). The software initializes the hardware in the module 151 and activates and works all the functions (Active) to function. Although not illustrated, in the case of the failure, only some of the hardware is activated (Activate) and the other hardware is caused not to function in the initialization of the hardware in the module 151.

Thereafter, the module 151 enters a normal running state and periodically communicates with the PSE (Network Switch) (Status Monitoring) and monitors whether or not a reduction in the supplied power is requested. When the reduction in the supplied power is requested corresponds to occurrence of an abnormality, and a sequence similar to that in a power shortage (failure) at the time of activation may be started.

In the broadcast system 10 illustrated in FIG. 1, the first module 151 receiving the response indicating that the requested power is not able to be supplied from the network switch 106 among the plurality of modules 151 included in the switch control panel 105 performs a process of displaying an abnormality (power error display). For example, the first module 151 performs control such that the abnormality (power error) is displayed on the indicator included in the first module 151 or the indicator of the subordinate module 152 connected to the first module 151.

In addition, for example, the first module 151 notifies the second module 151 of the abnormality (power error) via the network. In this case, for example, the second module 151 is a module that includes an indicator and performs control such that the abnormality (power error) is displayed on the indicator. In addition, in this case, for example, the second module 151 performs control such that the abnormality (power error) is displayed on the indicator of the subordinate module 152 connected to the second module 151 to function.

Here, the indicator displaying the abnormality (power error) is, for example, a lighting component included in a button mechanism and the abnormality is displayed in a different display mode from a normal mode of the lighting component.

In the case of the switcher control panel 105 that includes an uncoupled module 151 including the touch panel manipulation unit 155 in addition to the plurality of mechanically coupled modules 151, for example, the uncoupled module 151 serves as the second module 151. The first module 151 notifies the second module 151 of the abnormality (power error).

In addition, for example, the first module 151 adds relative positional information of the first module 151 in the plurality of mechanically coupled modules and notifies the second module 151 of the abnormality (power error). In this case, the second module 151 can perform control such that a position of the module 151 at which there is the abnormality (power error) is displayed on the indicator.

In addition, for example, according to the process of displaying the abnormality in the first module 151, the abnormality (power error) is displayed on the indicator of the module 151 located at a specific position in the relative positional relation in the plurality of mechanically coupled modules 151. Here, for example, the module 151 located at the specific position includes a plurality of indicators and the abnormality (power error) is displayed on the specific indicator among the plurality of indicators.

In addition, for example, the first module 151 transmits an error notification and a message for requesting a response to the second module 151 which is a module having higher priority than the first module 151. Then, the first module 151 stops all the functions when the response is transmitted from the second module 151. Conversely, the first module 151 performs control such that the abnormality (power error) is displayed in the first module or the subordinate module 152 connected to the first module 151 to function when the response is not transmitted from the second module 151.

Here, the priority is, for example, priority in accordance with the relative positional relation between the plurality of modules 151 or priority in accordance with types of modules in the plurality of modules 151. In the case of the priority in accordance with the relative positional relation, for example, the priority is higher as the module 151 is disposed further forward in the line.

In addition, in the case of the priority in accordance with the types of modules, for example, the priority of a cross point manipulation module is set to be higher. The switcher control panel 105 includes the plurality of modules 151. An essential function of a switcher is selection and conversion of a video signal. Therefore, in a case in which all the plurality of modules are unable to be run, only the cross point manipulation module may preferably be started. Alternatively, the priority of a certain module 151 to which a minimum of one cross point manipulation module is connected as the subordinate module 152 may be set to be high.

A transaction manipulation module or the like is a portion that receives a manipulation of mixing and can manipulate configurations and effects of various screens. However, even when the transaction manipulation module or the like does not function at the time of an emergency, a broadcast use can continue. Therefore, there is an economic value when the cross point manipulation module is preferentially run. In addition, a minimum manipulation for the broadcast administration is a manipulation of selecting an input signal with regard to a video signal output of one system. Accordingly, when one cross point button line can be manipulated on the entire panel, minimum use is possible.

In addition, when the first module 151 notifies the second module 151 of the abnormality (power error) via the network and the position of the first module 151 subsequently is an emergency running position, at least an emergency running function is enabled. When the position of the first module 151 is not the emergency running position, all the functions stop. For example, a certain cross point manipulation module is set to serve as a module at the emergency running position.

Figure 10:
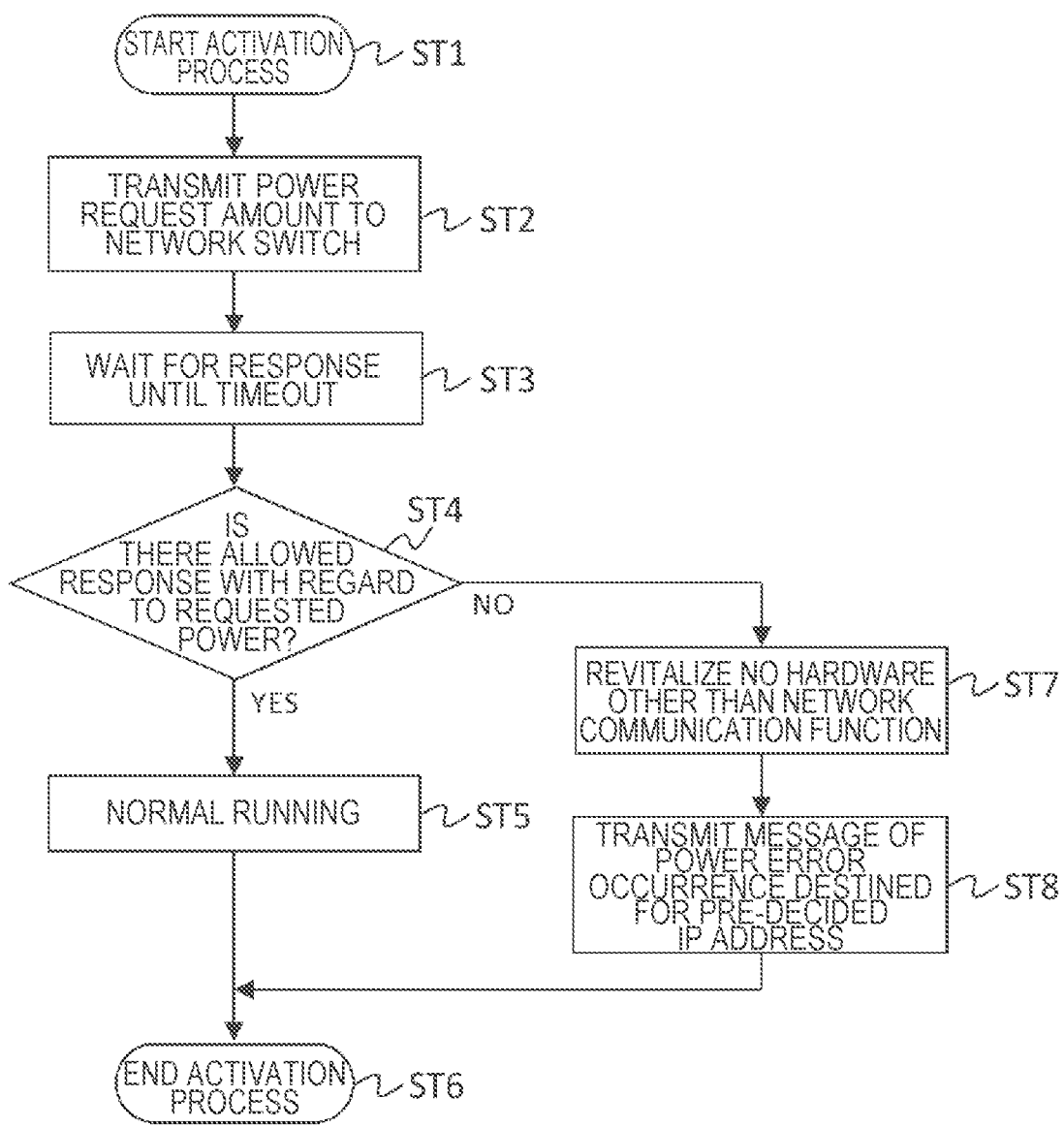
FIG. 10 is a flowchart illustrating an example of an activation process of a CPU of the module.

The flowchart of FIG. 10 illustrates an example of an activation process of the CPU of the module 151. The CPU starts the activation process in step ST1. Thereafter, the CPU transmits a power request amount to the network switch (switch hub) 106 in step ST2 and waits for a response until timeout in step ST3.

Subsequently, in step ST4, the CPU determines whether or not there is an allowed response with regard to the requested power. When there is the allowed response, the CPU performs control to a normal running state in step ST5 and subsequently ends the activation process in step ST6.

Conversely, when there is no allowed response in step ST4, that is, there is no response or a smaller value than the requested power value is returned, the CPU performs control such that the hardware is not revitalized other than a network communication function in step ST7. Then, in step ST8, the CPU subsequently transmits a message of power error occurrence (abnormality occurrence) designated for a pre-decided IP address.

Figure 11:
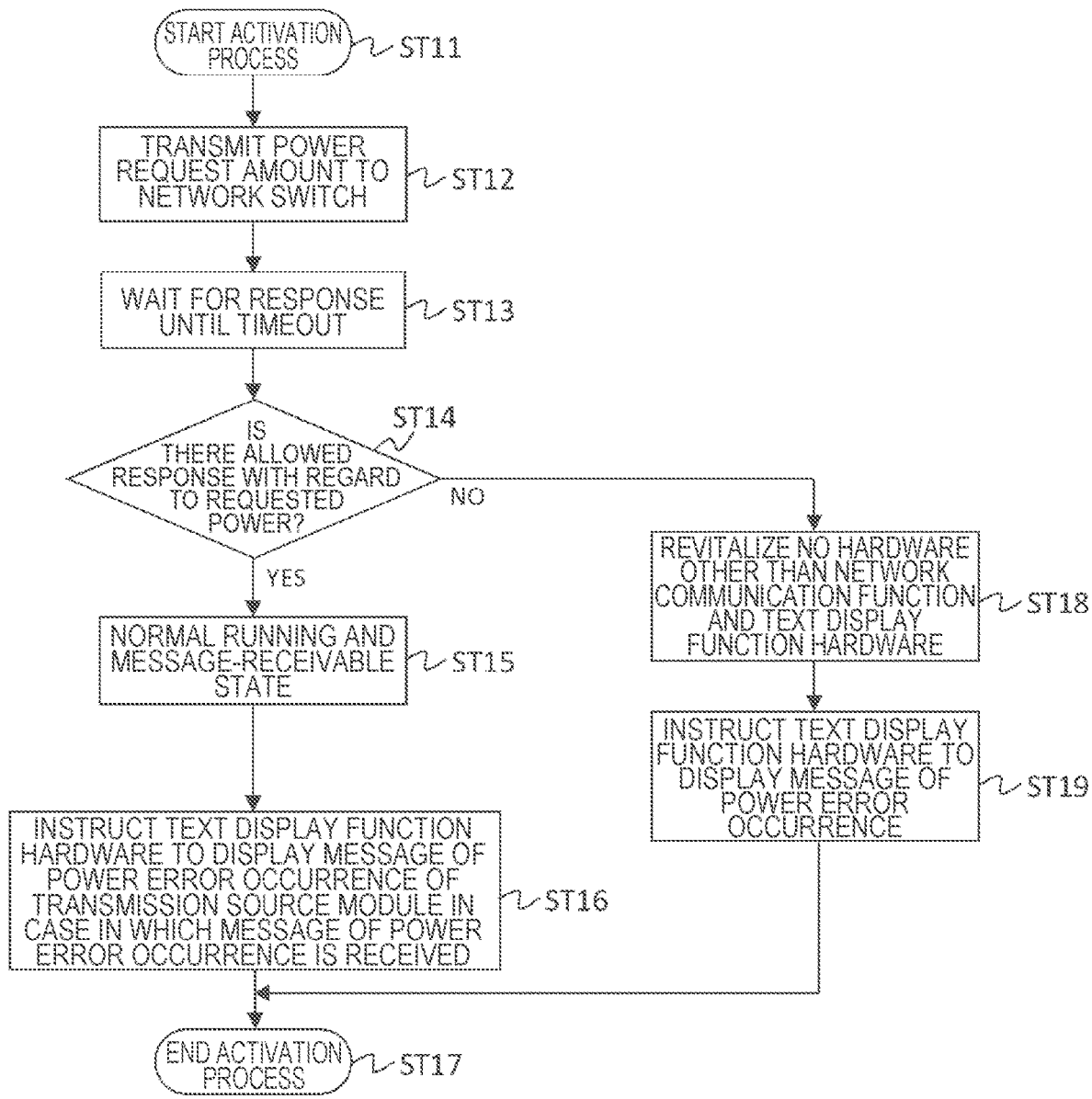
FIG. 11 is a flowchart illustrating another example of an activation process of a CPU of the module.

In addition, the flowchart of FIG. 11 illustrates another example of an activation process of the CPU of the module 151. The CPU starts the activation process in step ST11. Thereafter, the CPU transmits a power request amount to the network switch (switch hub) 106 in step ST12 and waits for a response until timeout in step ST13.

Subsequently, in step ST14, the CPU determines whether or not there is an allowed response with regard to the requested power. When there is the allowed response, the CPU performs control to a normal running state in step ST15 and performs control to a message-receivable state.

Then, in a case in which the message of the power error occurrence is received, the CPU instructs text display function hardware to display the message of the power error occurrence of the transmission source module 151 in step ST16 and subsequently ends the activation process in step ST17.

Conversely, when there is no allowed response in step ST14, that is, there is no response or a smaller value than the requested power value is returned, the CPU performs control such that the hardware is not revitalized other than a network communication function and the text display function hardware in step ST18. Then, the CPU subsequently instructs the text display function hardware to display the message of the power error occurrence in step S19. Thereafter, the activation process ends in step ST17.

Figure 12:
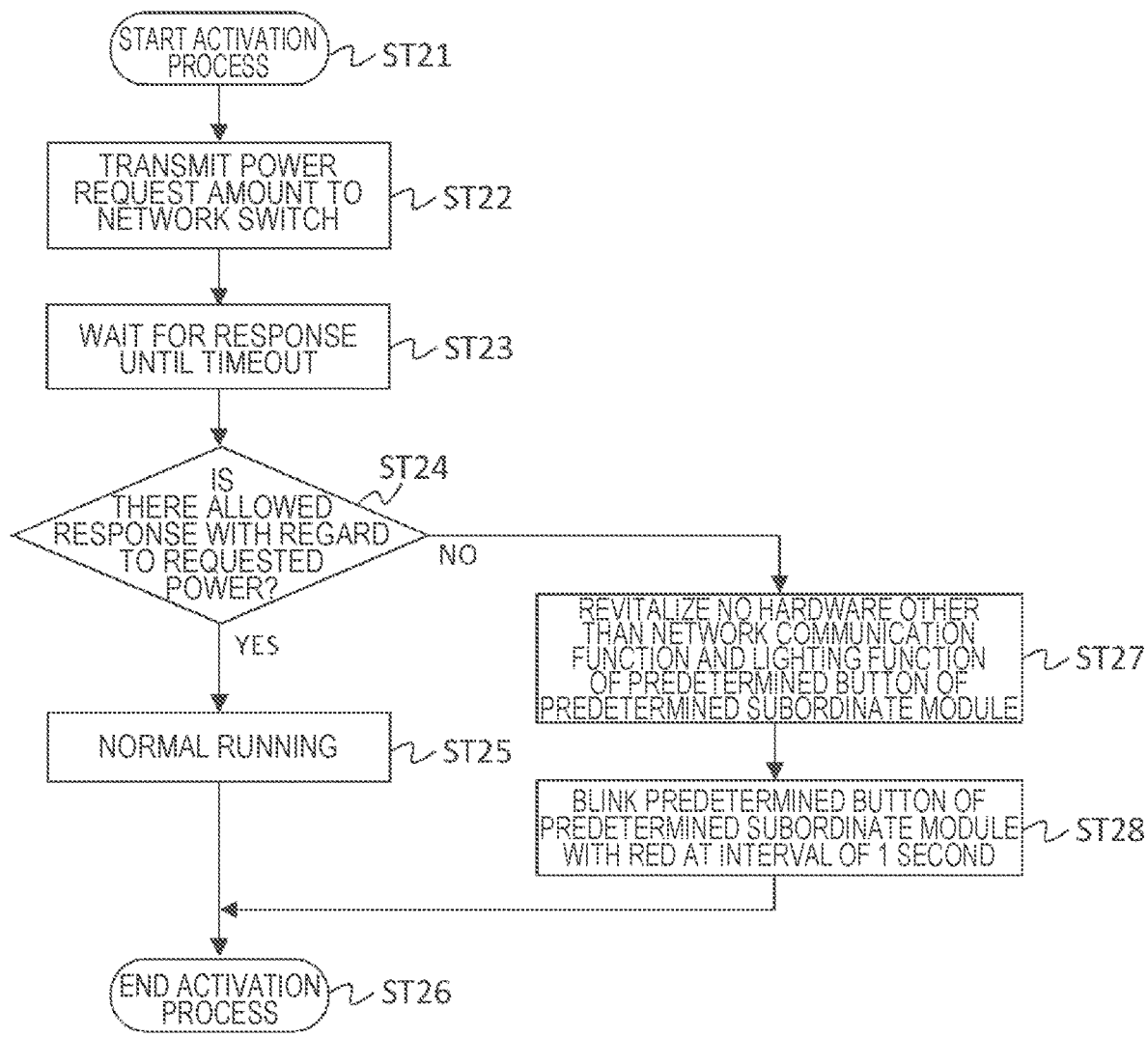
FIG. 12 is a flowchart illustrating another example of an activation process of a CPU of the module.

In addition, the flowchart of FIG. 12 illustrates still another example of an activation process of the CPU of the module 151. The CPU starts the activation process in step ST21. Thereafter, the CPU transmits a power request amount to the network switch (switch hub) 106 in step ST22 and waits for a response until timeout in step ST23.

Subsequently, in step ST24, the CPU determines whether or not there is an allowed response with regard to the requested power. When there is the allowed response, the CPU performs control to a normal running state in step ST25 and subsequently ends the activation process in step ST26.

Conversely, when there is no allowed response in step ST24, that is, there is no response or a smaller value than the requested power value is returned, the CPU performs control such that the hardware is not revitalized other than a network communication function and a predetermined button of a predetermined subordinate module 152, for example, a lighting function of a front left end button of the left subordinate module 152 in step ST27. Then, in step ST28, the CPU subsequently controls the predetermined button of the predetermined subordinate module 152 such that red blinks at an interval of 1 second. Thereafter, the activation process ends in step ST26.

Note that in the above-described activation process example, a power error (abnormality) is displayed by controlling the button such that red blinks at the interval of 1 second, but another display mode of the power error (abnormality) may be used.

Figure 13:
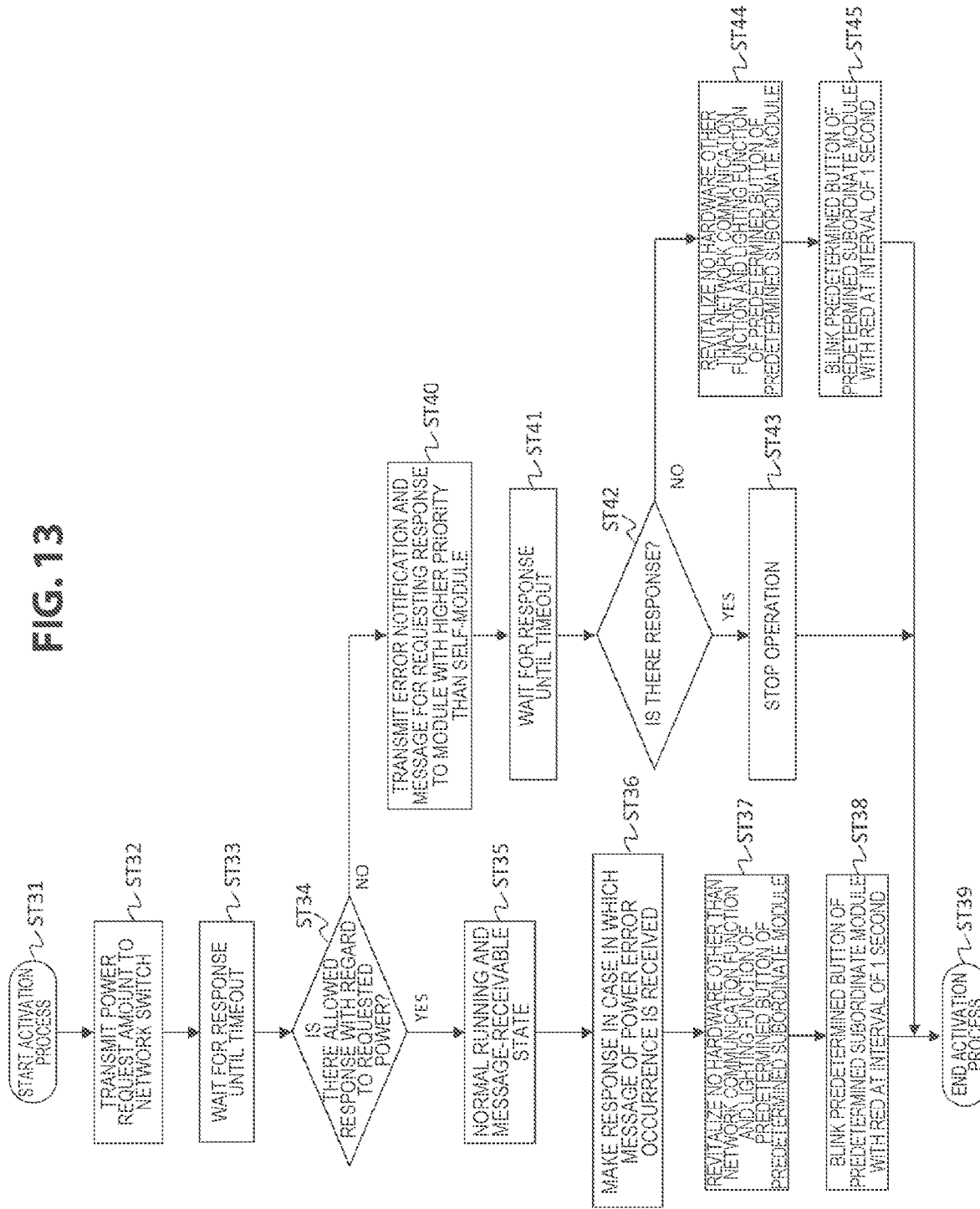
FIG. 13 is a flowchart illustrating another example of an activation process of a CPU of the module.

In addition, the flowchart of FIG. 13 illustrates still another example of an activation process of the CPU of the module 151. The CPU starts the activation process in step ST31. Thereafter, the CPU transmits a power request amount to the network switch (switch hub) 106 in step ST32 and waits for a response until timeout in step ST33.

Subsequently, in step ST34, the CPU determines whether or not there is an allowed response with regard to the requested power. When there is the allowed response, the CPU performs control to a normal running state and controls a message-receivable state in step ST35.

Subsequently, the CPU makes a response in step ST36 in a case in which a message of power error occurrence is received. Then, in step ST37, the CPU performs control such that the hardware is not revitalized other than a network communication function and a lighting function of a predetermined button of the predetermined subordinate module 152. Then, in step ST38, the CPU controls the predetermined button of the predetermined subordinate module 152 such that red blinks at an interval of 1 second. Thereafter, the activation process ends in step ST39.

Note that in the processes of step ST37 and step ST38, a power error (abnormality) is displayed using the predetermined button of the predetermined subordinate module 152. However, for example, the power error (abnormality) may be displayed using the predetermined button of the self-module 151.

Conversely, when there is no allowed response in step ST34, that is, there is no response or a smaller value than the requested power value is returned, the CPU transmits an error notification and a message for requesting a response to the module 151 with higher priority than the self-module 151 in step ST40. Thereafter, the CPU waits for a response until timeout in step ST41.

For example, pre-decided IP address is set in each module 151 which is not a subordinate module. For example, an earlier IP address is set in the module 151 with higher priority. In addition, as described above, as the priority, there is priority in accordance with relative positional relation in the plurality of modules 151, priority in accordance with the types of modules in the plurality of modules 151, or the like.

Subsequently, in step ST42, the CPU determines whether or not there is a response from the module 151 to which the message has been transmitted. When there is the response, the CPU stops the working in step ST43 and subsequently ends the activation process in step ST39. Note that when the working is stopped, the power consumption stops and the power supply from the network switch 106 is cut off.

Conversely, when there is no response in step ST42, the CPU performs control such that the hardware is not revitalized other than a network communication function and a lighting function of a predetermined button of the predetermined subordinate module 152 in step ST44. Then, in step ST45, the CPU controls the predetermined button of the predetermined subordinate module 152 such that red blinks at an interval of 1 second. Thereafter, the activation process ends in step ST39.

Note that in the processes of step ST44 and step ST45, a power error (abnormality) is displayed using the predetermined button of the predetermined subordinate module 152. However, for example, the power error (abnormality) may be displayed using the predetermined button of the self-module 151.

Figure 14:
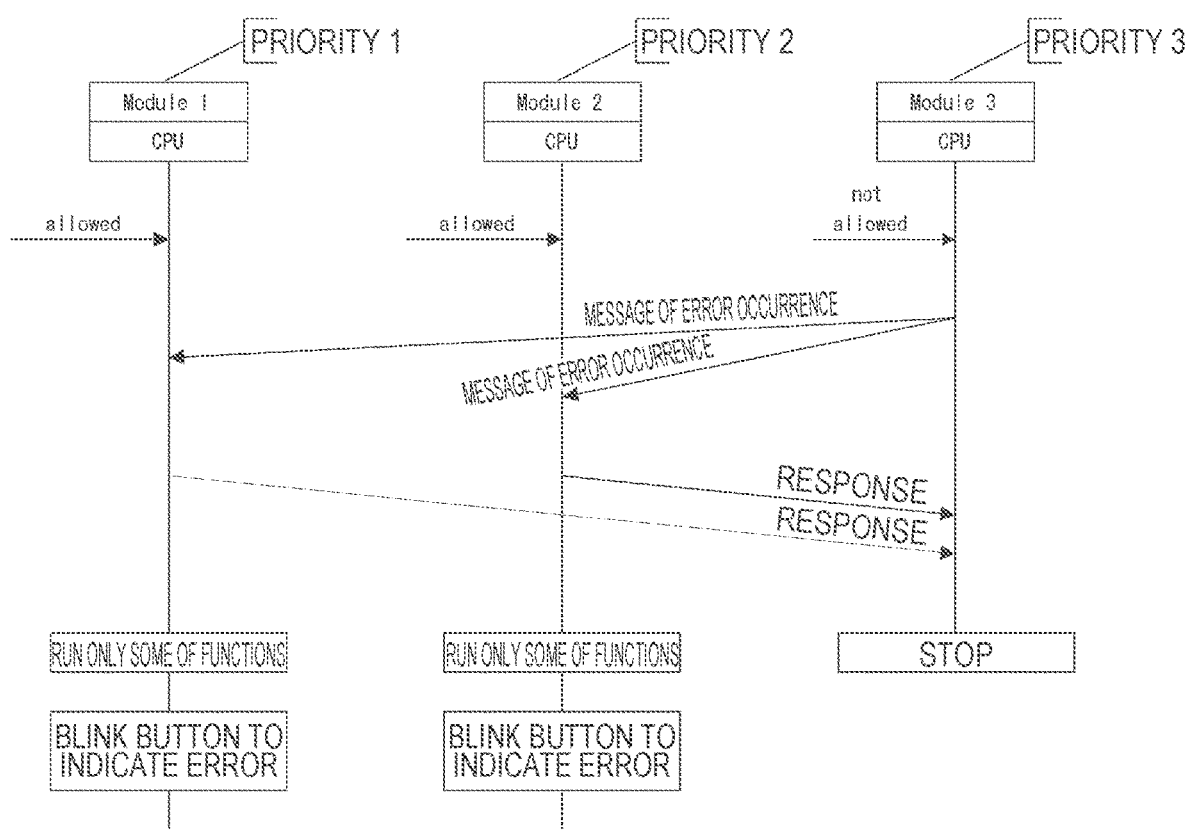
FIG. 14 is a diagram illustrating an example of a communication sequence between the modules at the time of an activation process.

FIG. 14 illustrates an example of a communication sequence between the modules corresponding to the activation process illustrated in the flowchart of FIG. 13. The example of the communication sequence is an example of a case in which there are three modules, Module 1 with priority 1, Module 2 with priority 2, and Module 3 with priority 3. Then, the example is an example of a case in which there is the allowed response in Modules 1 and 2 and there is no allowed response in Module 3 with regard to the requested power.

In this case, an error notification and a message of error occurrence for obtaining a response are transmitted from Module 3 to Modules 1 and 2. In response to the message, the responses are sent from Modules 1 and 2 to Module 3. As a result, Module 3 stops working, and Modules 1 and 2 run only some of the functions and a button blinks to indicate an error.

Figure 15:
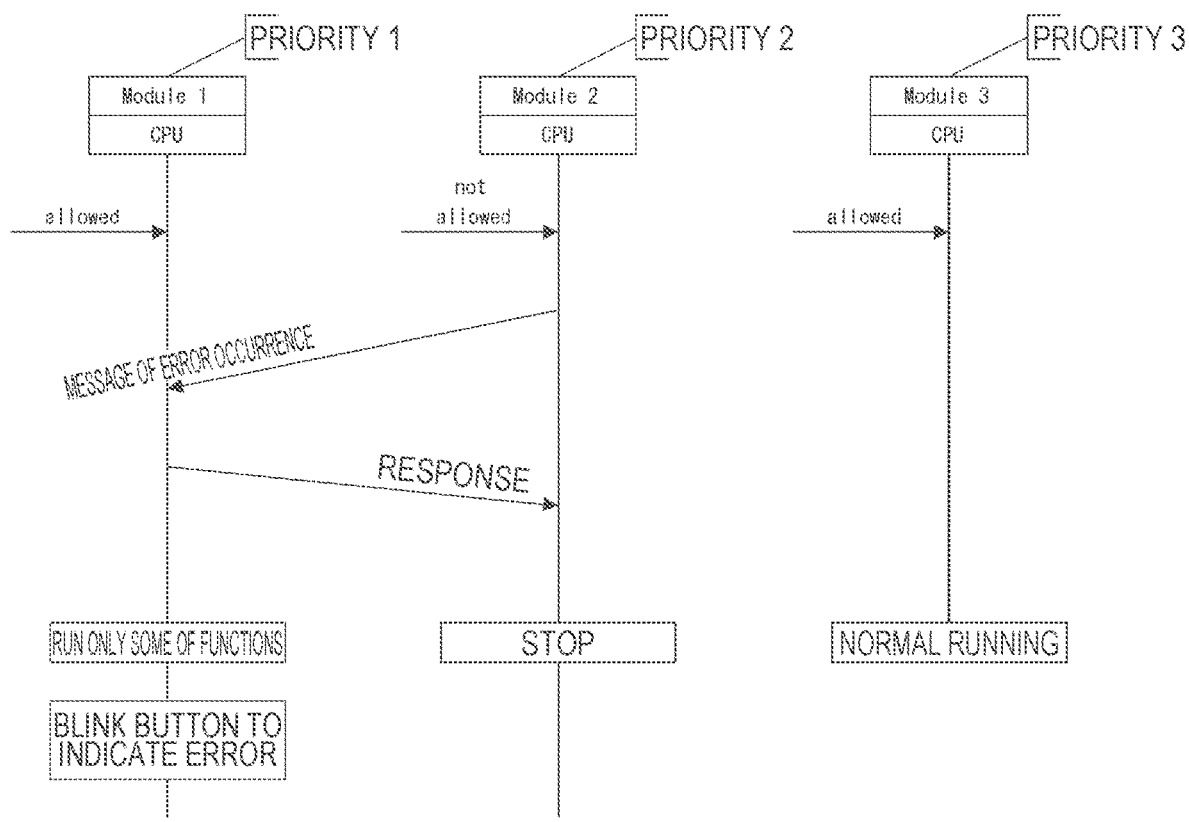
FIG. 15 is a diagram illustrating another example of the communication sequence between the modules at the time of the activation process.

FIG. 15 illustrates another example of a communication sequence between the modules corresponding to an example of the activation process illustrated in the flowchart of FIG. 13. The example of the communication sequence is an example of a case in which there are three modules, Module 1 with priority 1, Module 2 with priority 2, and Module 3 with priority 3. Then, the example is an example of a case in which there is the allowed response in Modules 1 and 3 and there is no allowed response in Module 2 with regard to the requested power.

In this case, an error notification and a message of error occurrence for obtaining a response are transmitted from Module 2 to Module 1. In response to the message, the response is sent from Module 1 to Module 2. As a result, Module 2 stops working, and Module 1 runs only some of the functions and a button blinks to indicate an error. Note that Module 3 performs normal running.

Figure 16:
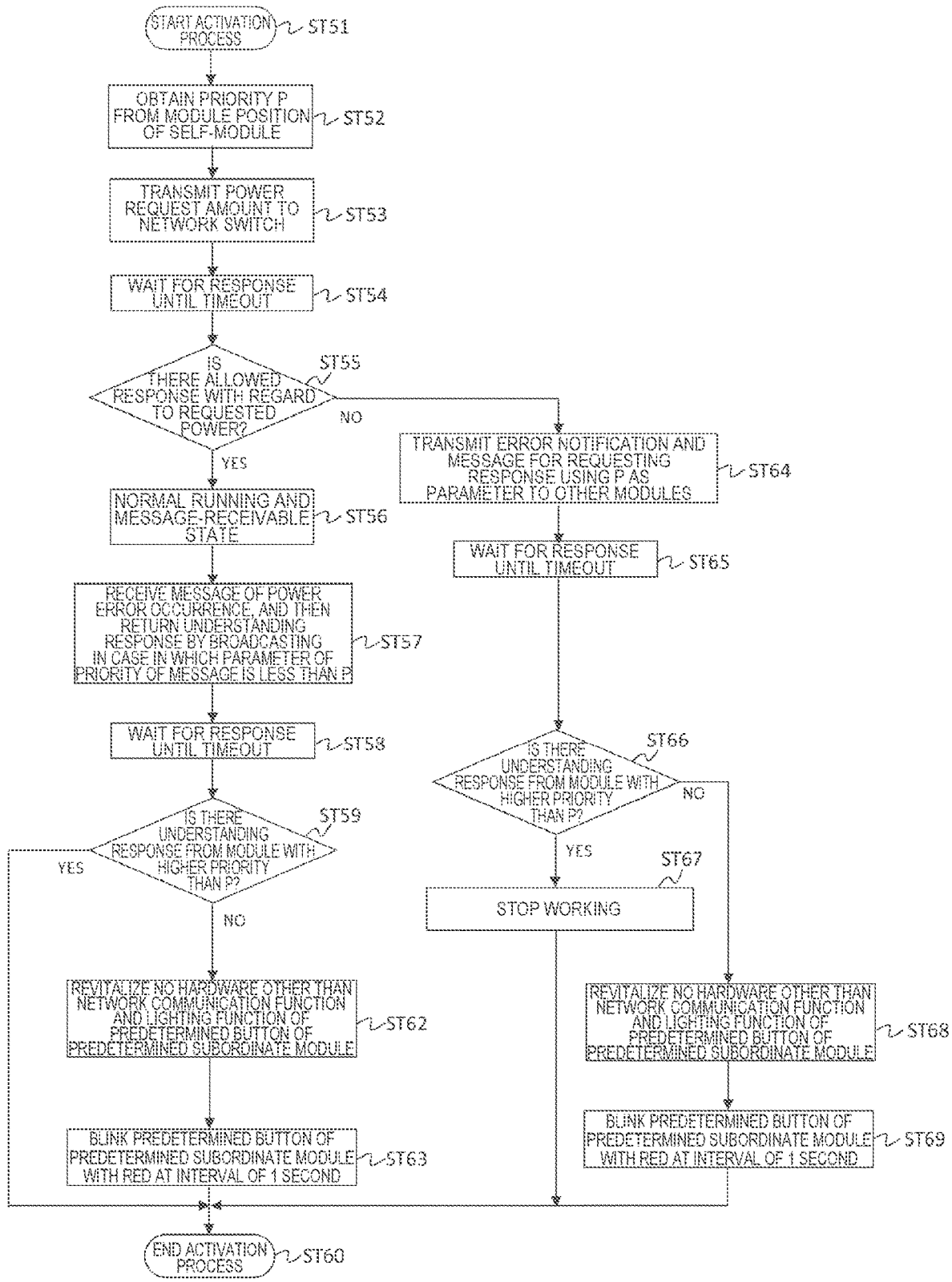
FIG. 16 is a flowchart illustrating another example of an activation process of a CPU of the module.

The flowchart of FIG. 16 illustrates still another example of an activation process of the CPU of the module 151. In step ST51, the CPU starts the activation process. Thereafter, the CPU obtains priority P from the position of the self-module 151 in step ST52. For example, the self-module ascertains a line in which the self-module is located from electric information from a contact of the base frame 110 or electric information at a contact between the mutual modules and the line with an earlier number is set as a priority line.

Subsequently, the CPU transmits a power request amount to the network switch (switch hub) 106 in step ST53 and waits for a response until timeout in step ST54.

Subsequently, in step ST55, the CPU determines whether or not there is an allowed response with regard to the requested power. When there is the allowed response, the CPU performs control to a normal running state in step ST56 and performs control to a message-receivable state.

Subsequently, the CPU receives a message of power error occurrence in step ST57. In a case in which a parameter of the priority of the message is less than P, the CPU returns an understanding response by broadcasting and waits for a response until timeout in step ST58.

Subsequently, in step ST59, the CPU determines whether or not there is the understanding response from the module 151 with the higher priority than P. When there is the response, the CPU ends the activation process in step ST60. Conversely, when there is no response, the CPU moves the process to step ST62.

In step ST62, the CPU performs control such that the hardware is not revitalized other than the network communication function and a lighting function of a predetermined button of the predetermined subordinate module 152. Then, in step ST63, the CPU controls the predetermined button of the predetermined subordinate module 152 such that red blinks at an interval of 1 second. Thereafter, the activation process ends in step ST60.

Note that in the processes of step ST62 and step ST63, a power error (abnormality) is displayed using the predetermined button of the predetermined subordinate module 152. However, for example, the power error (abnormality) may be displayed using the predetermined button of the self-module 151.

Conversely, when there is no allowed response in step ST55, that is, there is no response or a smaller value than the requested power value is returned, the CPU transmits an error notification and a message for requesting a response using P as a parameter to the other modules 151 in step ST64. When there is the understanding response, the CPU stops the working in step S67. Thereafter, the activation process ends in step ST60. Note that when the working is stopped, the power consumption stops and the power supply from the network switch 106 is cut off.

Conversely, when there is no response in step ST66, the CPU performs control such that the hardware is not revitalized other than a network communication function and a lighting function of a predetermined button of the predetermined subordinate module 152 in step ST68. Then, in step ST69, the CPU controls the predetermined button of the predetermined subordinate module 152 such that red blinks at an interval of 1 second. Thereafter, the activation process ends in step ST60.

Note that in the processes of step ST68 and step ST69, a power error (abnormality) is displayed using the predetermined button of the predetermined subordinate module 152. However, for example, the power error (abnormality) may be displayed using the predetermined button of the self-module 151.

Figure 17:
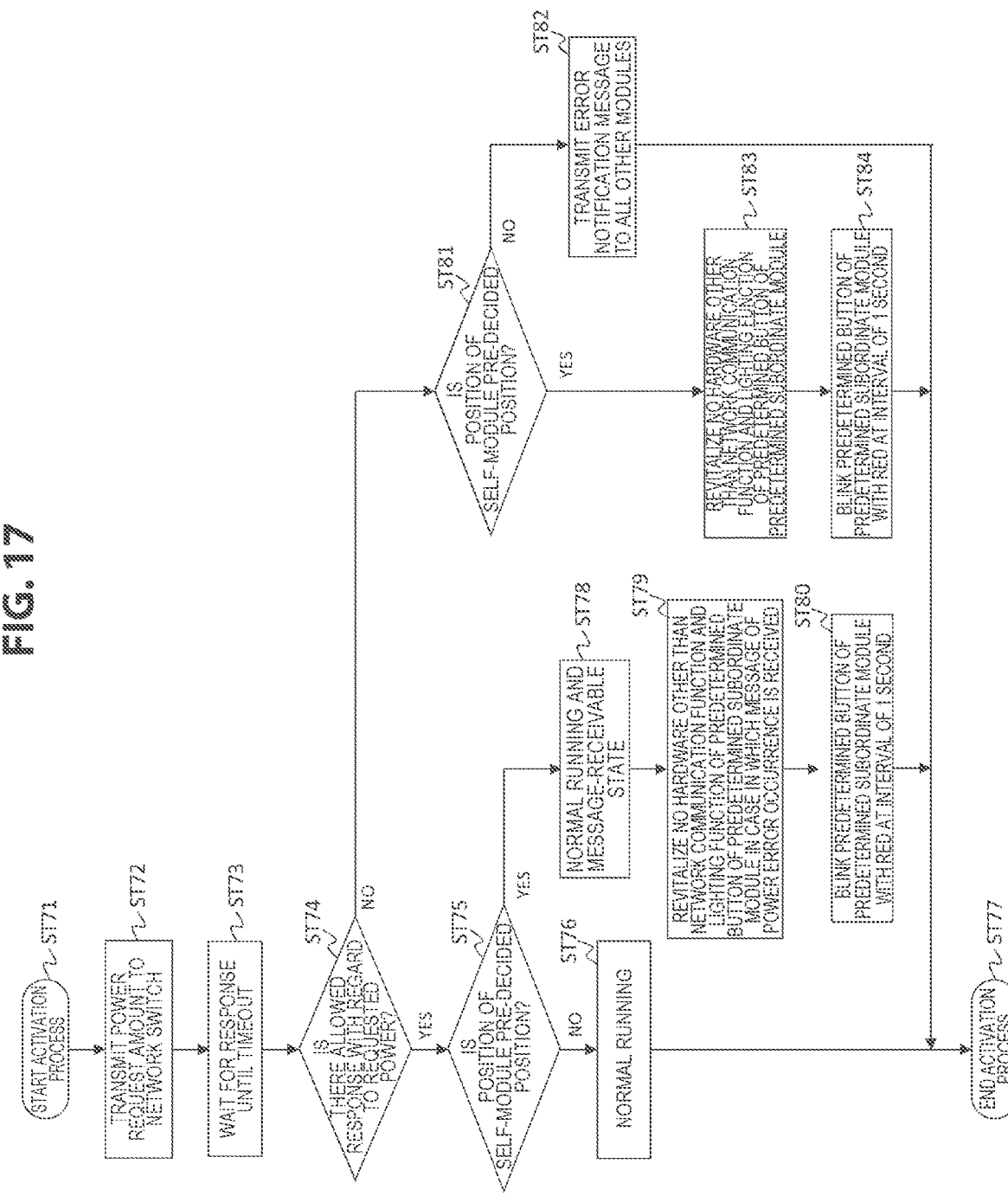
FIG. 17 is a flowchart illustrating another example of an activation process of a CPU of the module.

The flowchart of FIG. 17 illustrates still another example of an activation process of the CPU of the module 151. In step ST71, the CPU starts the activation process. Thereafter, the CPU transmits a power request amount to the network switch (switch hub) 106 in step ST72 and waits for a response until timeout in step ST73.

Subsequently, in step ST74, the CPU determines whether or not there is an allowed response with regard to the requested power. When there is the allowed response, the CPU determines whether or not the position of the self-module 151 is a pre-decided position (for example, the first line) in step ST75. When the position is not the pre-decided position, the CPU performs control to the normal running state in step ST76 and subsequently ends the activation process in step ST77. Conversely, when the position is the pre-decided position, the CPU performs control to the normal running state and control to a message-receivable state in step 78.

Subsequently, in a case in which the message of the power error occurrence is received, the CPU performs control such that the hardware is not revitalized other than a network communication function and a lighting function of a predetermined button of the predetermined subordinate module 152 in step ST79. Then, in step ST80, the CPU controls the predetermined button of the predetermined subordinate module 152 such that red blinks at an interval of 1 second. Thereafter, the activation process ends in step ST77.

Note that in the processes of step ST79 and step ST80, a power error (abnormality) is displayed using the predetermined button of the predetermined subordinate module 152. However, for example, the power error (abnormality) may be displayed using the predetermined button of the self-module 151.

Conversely, when there is no allowed response in step ST74, that is, there is no response or a smaller value than the requested power value is returned, the CPU determines whether or not the position of the self-module is the pre-decided position (for example, the first line) in step ST81. When the position is not the pre-decided position, the CPU transmits an error notification message to all the other modules 151 in step ST82. Thereafter, the activation process ends in step ST77.

Conversely, when the position is the pre-decided position, the CPU performs control such that the hardware is not revitalized other than the network communication function and the lighting function of the predetermined button of the predetermined subordinate module 152 in step ST83. Then, in step ST84, the CPU controls the predetermined button of the predetermined subordinate module 152 such that red blinks at an interval of 1 second. Thereafter, the activation process ends in step ST77.

Note that in the processes of step ST83 and step ST84, a power error (abnormality) is displayed using the predetermined button of the predetermined subordinate module 152. However, for example, the power error (abnormality) may be displayed using the predetermined button of the self-module 151.

Figure 18:
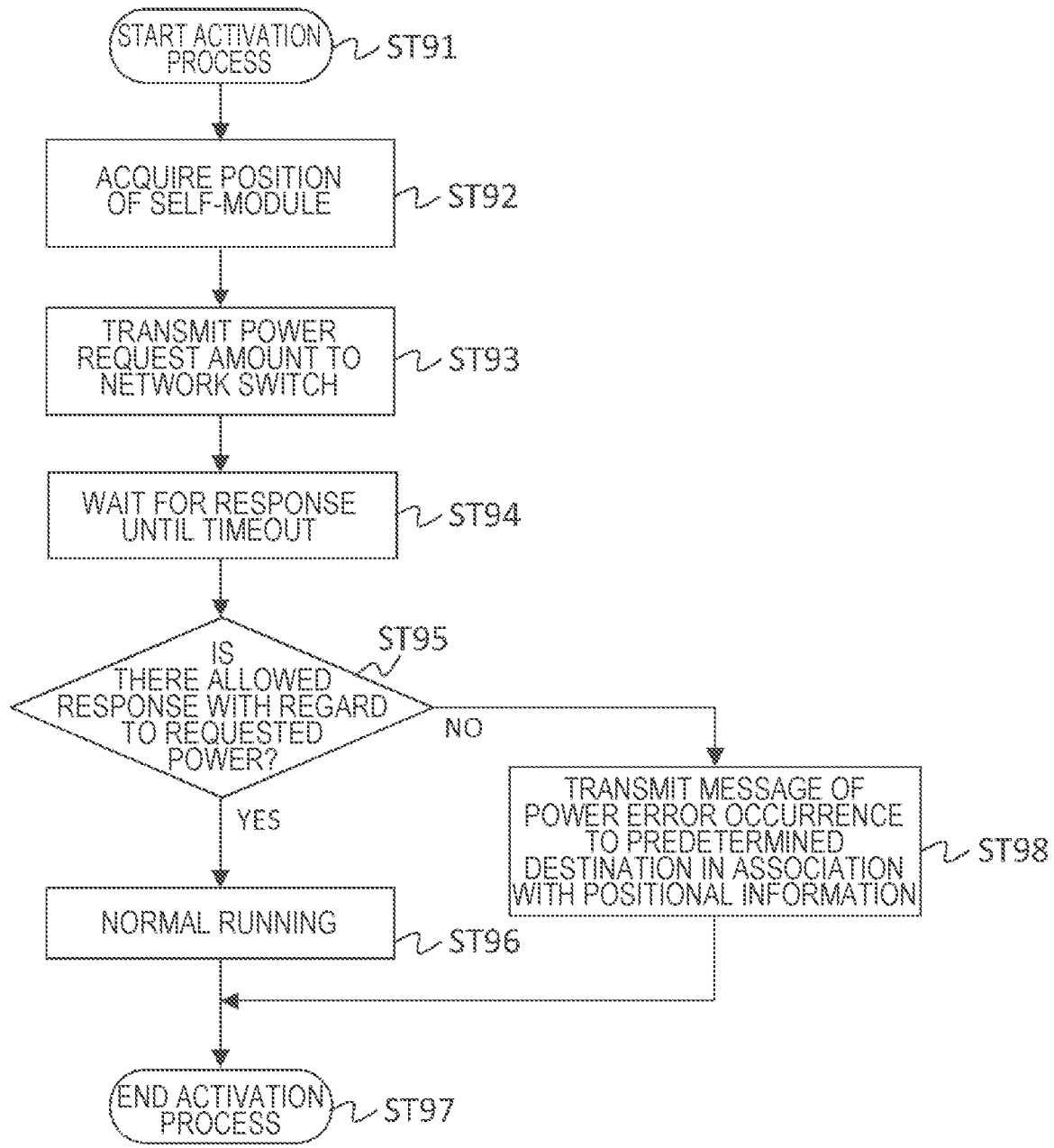
FIG. 18 is a flowchart illustrating another example of an activation process of a CPU of the module.

The flowchart of FIG. 18 illustrates still another example of an activation process of the CPU of the module 151. In step ST91, the CPU starts the activation process. Thereafter, the CPU acquires a position of the self-module 151 in step ST92. For example, the self-module obtains a line in which the self-module is located from electric information from a contact of the base frame 110 or electric information at a contact between the mutual modules.

Subsequently, the CPU transmits a power request amount to the network switch (switch hub) 106 in step ST93 and waits for a response until timeout in step ST94.

Subsequently, in step ST95, the CPU determines whether or not there is an allowed response with regard to the requested power. When there is the allowed response, the CPU performs control to a normal running state in step ST96. Therefore, the activation process ends in step ST97.

Conversely, when there is no allowed response in step ST95, that is, there is no response or a smaller value than the requested power value is returned, the CPU transmits a message of an error notification to a predetermined destination in association with positional information in step ST98. Therefore, the activation process ends in step ST97. For example, the predetermined destination is a preset IP address, a host name, an SNMP manager, or the like. In this case, the module 151 receiving notification of abnormality controls display of the abnormality (power error) in combination with display of the positional information. For example, a specific button of the self-module 151 or the subordinate module 152 is caused to blink or the like.

Figure 19:
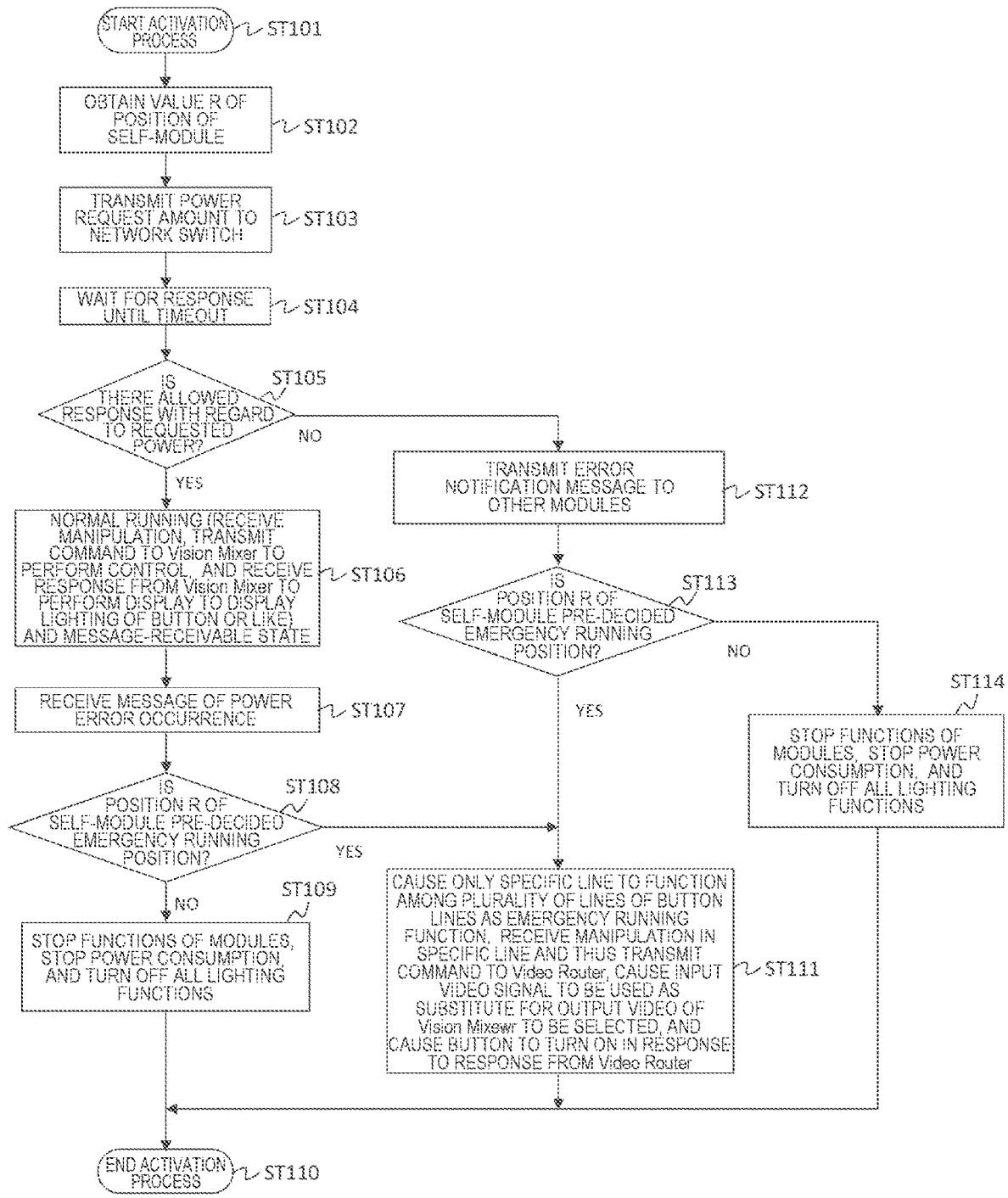
FIG. 19 is a flowchart illustrating another example of an activation process of a CPU of the module.

FIG. 19 illustrates another example of the activation process of the CPU of the module 151. In the example of the activation process, the module 151 is assumed to be necessarily at a pre-decided emergency running position. In step ST101, the CPU starts the activation process. Thereafter, in step ST102, the CPU obtains a position R of the self-module 151.

For example, the self-module ascertains a line in which the self-module is located from electric information from a contact of the base range 110 or electric information at a contact between the mutual modules. Note that an IP address of the module 151 may be decided from R. For example, an end of the address is set as R and the other high-order portion is set as a preset regulated value.

Subsequently, the CPU transmits a power request amount to the network switch (switch hub) 106 in step ST103 and waits for a response until timeout in step ST104.

Subsequently, in step ST105, the CPU determines whether or not there is an allowed response with regard to the requested power. When there is the allowed response, the CPU performs control to a normal running state in step ST106 and performs control to a message-receivable state. In the normal running state, a command is sent to the vision mixer 102 to perform control and a response is received from the vision mixer 102 to display lighting of a button or the like.

Subsequently, after the CPU receives the power error message in step ST107, the CPU determines whether or not the position R of the self-module is a pre-decided emergency running position in step ST108. When the position is not the emergency running position, the CPU stops the functions of the modules, stops the power consumption, and turn off all the lighting functions in step ST109. Thereafter, in step ST110, the CPU ends the activation process.

Conversely, when the position is the emergency running position, the CPU moves the process to step ST111. In step ST111, the CPU causes only a specific line to function among a plurality of lines of the button lines as an emergency running function. Then, when a manipulation is received in the specific line, the CPU transmits a command to the video router 101, selects an input video signal to be used as a substitute for an output video of the vision mixer 102, and cause the buttons to turn on in accordance with a response from the video router 101. Thereafter, in step ST110, the CPU ends the activation process.

Conversely, when there is no allowed response in step ST105, that is, there is no response or a smaller value than the requested power value is returned, the CPU transmits an error notification message to the other modules 151 in step S112.

Subsequently, in step ST113, the CPU determines whether or not the position R of the self-module is a pre-decided emergency running position. When the position is the emergency running position, the CPU performs the process of step ST111. Thereafter, in step ST110, the activation process ends. Conversely, when the position is not the emergency running position, the CPU stops the functions of the modules, stops the power consumption, and turn off all the lighting functions in step ST114. Thereafter, in step ST110, the CPU ends the activation process.

Figure 20:
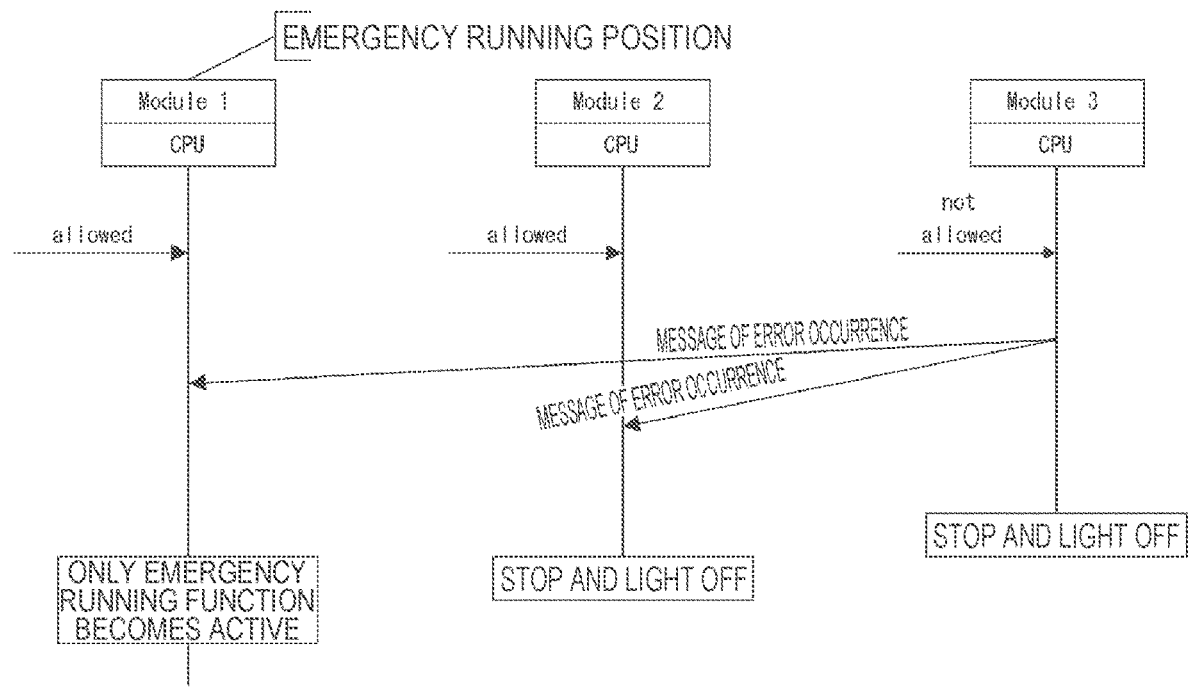
FIG. 20 is a diagram illustrating an example of a communication sequence between the modules at the time of an activation process.

FIG. 20 illustrates an example of a communication sequence between the modules corresponding to the activation process illustrated in the flowchart of FIG. 19. The example of the communication sequence is an example of a case in which there are Module 2 and Module 3 in addition to Module 1 located at an emergency running position. Then, the example is an example of a case in which there is the allowed response in Modules 1 and 2 and there is no allowed response in Module 3 with regard to the allowed response.

In this case, a message of error occurrence is sent from Module 3 to Modules 1 and 2. In this case, Module 1 enters a state in which only the emergency running function is started and Modules 2 and 3 stop and light off.

Figure 21:
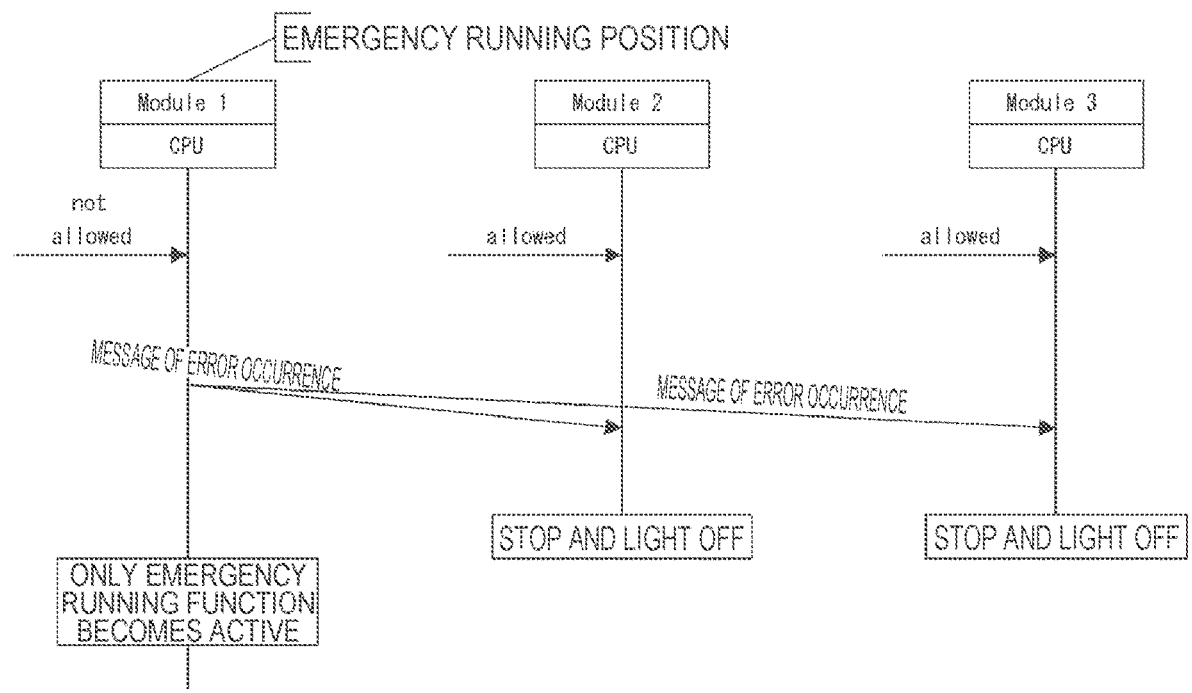
FIG. 21 is a diagram illustrating another example of the communication sequence between the modules at the time of the activation process.

FIG. 21 illustrates another example of the communication sequence between the modules corresponding to the activation process illustrated in the flowchart of FIG. 19. The example of the communication sequence is an example of a case in which there are Module 2 and Module 3 in addition to Module 1 located at an emergency running position. Then, the example is an example of a case in which there is the allowed response in Modules 2 and 3 and there is no allowed response in Module 1 with regard to the allowed response.

In this case, a message of error occurrence is sent from Module 1 to Modules 2 and 3. In this case, Module 1 enters a state in which only the emergency running function is started and Modules 2 and 3 stop and light off.

As described above, in the broadcast system 10 illustrated in FIG. 1, the first module 151 receiving a response indicating that requested power is not able to be supplied from a network performs a process of displaying an abnormality, for example, notifies the second module 151 of an abnormality via the network. Therefore, it is possible to perform the power error display satisfactorily in the plurality of modules to which power is supplied with the PoE technology.

In addition, in the broadcast system 10 illustrated in FIG. 1, the second module 151 receiving a power error message from the first module 151 via the network controls display of the abnormality, for example, displays a power error (abnormality) on the self-module 151 or the subordinate module 152. Therefore, it is possible to perform the power error display satisfactorily in the plurality of modules to which power is supplied with the PoE technology.

2. Modification Examples

Note that in the above-described embodiment, the example applied to the console (the switcher control panel) of the broadcast system has been described. However, the present technology can be applied as follows in addition to a console of a factory facility.

Additionally, the present technology may also be configured as below.

(1)

A module device including:

a plurality of modules containing a computer that has a network interface to which power is supplied with PoE, in which the plurality of modules are connected to a network, and a first module that receives a response indicating that requested power is not able to be supplied from the network performs a process of displaying an abnormality.

(2)

The module device according to (1), in which the first module notifies a second module of the abnormality via the network, and the second module controls display of the abnormality when the second module is notified of the abnormality.

(3)

The module device according to (2), in which the second module is a module that has an indicator, and the second module performs control such that the abnormality is displayed on the indicator.

(4)

The module device according to (2), further including:

a subordinate module connected to the second module to function, in which the second module performs control such that the abnormality is displayed on an indicator of the subordinate module.

(5)

The module device according to (3) or (4), in which the indicator is a lighting component included in a button mechanism, and the abnormality is displayed in a different display mode from a normal mode of the lighting component.

(6)

The module device according to any of (2) to (5), in which the plurality of modules include a mechanically coupled module group and one or more mechanically uncoupled modules, and the second module is one of the mechanically uncoupled modules.

(7)

The module device according to any of (2) to (6), in which the plurality of modules are mechanically coupled, and the first module adds relative positional information of the first module and notifies the second module of the abnormality.

(8)

The module device according to (7), in which the second module controls the display of the abnormality in combination with display of the positional information when the second module is notified of the abnormality.

(9)

The module device according to any of (1) to (8), in which the plurality of modules or the plurality of modules and a subordinate module connected to one of the plurality of modules to function are mechanically coupled, and according to the process of displaying the abnormality in the first module, the abnormality is displayed on an indicator of the module located at a specific position in a relative positional relation in the mechanically coupled modules.

(10)

The module device according to (9), in which the module located at the specific position includes a plurality of indicators, and the abnormality is displayed on a specific indicator among the plurality of indicators.

(11)

A module device including:

a plurality of modules containing a computer that has a network interface to which power is supplied with PoE, in which the plurality of modules are connected to a network, and a second module that receives a power error message from a first module via the network controls display of an abnormality.

(12)

The module device according to (11), in which the second module is a module that has an indicator, and the second module performs control such that the abnormality is displayed on the indicator.

(13)

The module device according to (11), further including:

a subordinate module connected to the second module to function, in which the second module performs control such that the abnormality is displayed on an indicator of the subordinate module.

(14)
The module device according to any one of (1) to (13), in which the first module transmits a message for requesting an error notification and a response to a second module which is a module having higher priority than the first module.
(15)
The module device according to (14), in which the first module stops all the functions when the response is transmitted from the second module.
(16)
The module device according to (14) or (15), in which the first module displays the abnormality in the first module or a subordinate module connected to the first module to function when the response is not transmitted from the second module.
(17)
The module device according to any one of (14) to (16), in which the priority is priority in accordance with types of modules in the plurality of modules.
(18)
The module device according to any one of (14) to (16), in which the priority is priority in accordance with a relative positional relation between the plurality of modules.
(19)
The module device according to any one of (2) to (18),
in which the first module notifies the second module of the abnormality via the network,
when a position of the module device is an emergency running position, at least an emergency running function is started, and
when the position of the module device is not the emergency running position, all the functions stop.
(20)
A broadcast system including:
a control panel,
in which the control panel includes a plurality of modules containing a computer that has a network interface to which power is supplied with PoE,
the plurality of modules are connected to a network, and
a first module that receives a response indicating that requested power is not able to be supplied from the network performs a process of displaying an abnormality.

REFERENCE SIGNS LIST 10 broadcast system
101 video router
102 vision mixer
103 video router configuration panel
104 personal computer
105 switcher control panel
106 network switch (switch hub)
110 base frame
151 module
152 subordinate module
153 push button
154 indicator
155 touch panel manipulation unit
156 power supply line
161 lighting push button
162 text indicator
163 connection metal fitting portion
164 connector portion
171 CPU
172 RAM
173 ROM
174 storage
175 manipulation button-mounted circuit
176 PoE-compliant network interface

The invention claimed is:
1. A module device, comprising:
a plurality of modules, wherein
each module of the plurality of modules includes a central processing unit (CPU),
the CPU includes a network interface configured to receive power from a network by power over ethernet (PoE),
the plurality of modules includes a first module and a second module,
the first module is configured to:
transmit a request to the network, wherein the request indicates a first power value;
receive a response based on the request, wherein the response indicates a second power value smaller than the first power value;
display an abnormality indication that indicates a power error in the first module, wherein the abnormality indication is displayed based on the response; and
notify the power error to the second module, and
the second module is configured to control an indicator to display the abnormality indication that indicates the power error in the first module, wherein the indicator is controlled to display the abnormality indication based on the notification of the power error.
2. The module device according to claim 1, wherein the second module includes the indicator.
3. The module device according to claim 1, further comprising a subordinate module connected to the second module to function, wherein the subordinate module includes the indicator.
4. The module device according to claim 2, wherein the indicator is a lighting component, and
a mode of the display of the abnormality indication by the indicator is different from a normal mode of the lighting component.
5. The module device according to claim 1, wherein the plurality of modules includes:
a mechanically coupled module group including the second module, and
at least one mechanically uncoupled module.
6. The module device according to claim 1, wherein the first module is mechanically coupled to the second module,
the first module is further configured to notify relative positional information of the first module to the second module, and
the relative positional information of the first module is positional information of the first module relative to the second module.
7. The module device according to claim 6, wherein the second module is further configured to control the indicator to display the abnormality indication with the relative positional information of the first module.
8. The module device according to claim 1, further comprising a subordinate module connected to one of the plurality of modules, wherein
the first module is mechanically coupled to the second module, and
the subordinate module is mechanically coupled to the plurality of modules.

9. The module device according to claim 8, wherein
the second module includes a plurality of indicators, and
the plurality of indicators includes the indicator.

10. A module device, comprising:
a plurality of modules, wherein
   each module of the plurality of modules includes a central processing unit (CPU),
   the CPU includes a network interface configured to receive power from a network by power over ethernet (PoE),
   the plurality of modules includes a first module and a second module,
   the second module is configured to:
      receive a power error message from the first module via the network, wherein the power error message indicates a power error in the first module; and
      control an indicator to display an abnormality indication that indicates the power error in the first module, wherein the indicator is controlled to display the abnormality indication based on the received power error message.

11. The module device according to claim 10, wherein the second module includes the indicator.

12. The module device according to claim 10, further comprising[[ ]] a subordinate module connected to the second module, wherein the subordinate module includes the indicator.

13. A broadcast system, comprising:
a control panel that includes a plurality of modules; wherein
   each module of the plurality of modules includes a central processing unit (CPU),
   the CPU includes a network interface configured to receive power from a network by power over ethernet (PoE),
   the plurality of modules includes a first module and a second module,
   the first module is configured to:
      transmit a request to the network, wherein the request indicates a first power value;
      receive a response based on the request, wherein the response indicates a second power value smaller than the first power value;
      display an abnormality indication that indicates a power error in the first module, wherein the abnormality indication is displayed based on the response; and
      notify the power error to the second module, and
   the second module is configured to control an indicator to display the abnormality indication that indicates the power error in the first module, wherein the indicator is controlled to display the abnormality indication based on the notification of the power error.

\* \* \* \* \*